Fredrick Lowell Jonach
Murray H. Edson     INVENTORS
James A. Wilson
BY W. O. T. Heilman
PATENT ATTORNEY

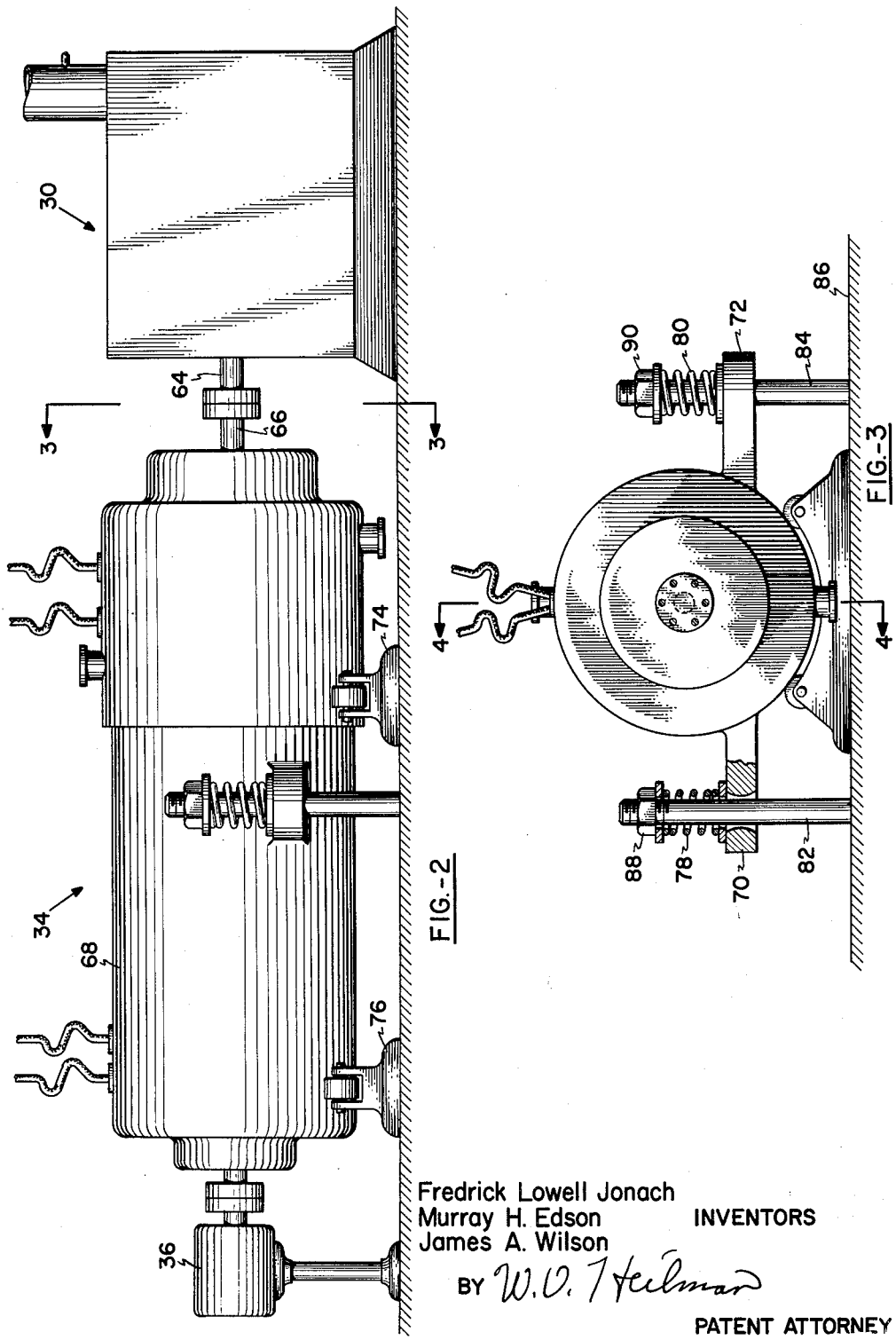

Jan. 16, 1962   F. L. JONACH ET AL   3,016,739
APPARATUS AND METHOD FOR AUTOMATIC CONTROL
Filed Jan. 5, 1960   13 Sheets-Sheet 3

Fredrick Lowell Jonach
Murray H. Edson
James A. Wilson   INVENTORS
BY W.O. Heilman
PATENT ATTORNEY Fredrick Lowell Jonach
Murray H. Edson
James A. Wilson
INVENTORS Fredrick Lowell Jonach
Murray H. Edson      INVENTORS
James A. Wilson
BY W. O. T Heilman
                    PATENT ATTORNEY Fredrick Lowell Jonach
Murray H. Edson    INVENTORS
James A. Wilson

PATENT ATTORNEY

Fredrick Lowell Jonach
Murray H. Edson      Inventors
James A. Wilson
By W.O.J. Feilman  Patent Attorney Jan. 16, 1962     F. L. JONACH ET AL     3,016,739
APPARATUS AND METHOD FOR AUTOMATIC CONTROL
Filed Jan. 5, 1960     13 Sheets-Sheet 13

Fredrick Lowell Jonach
Murray H. Edson     Inventors
James A. Wilson
By W.O. Heilman
    Patent Attorney

United States Patent Office 3,016,739
Patented Jan. 16, 1962

---

3,016,739
APPARATUS AND METHOD FOR
AUTOMATIC CONTROL
Fredrick Lowell Jonach, Kew Gardens, N.Y., and Murray H. Edson, Rahway, and James A. Wilson, Stanhope, N.J., assignors to Esso Research and Engineering Company, a corporation of Delaware
Filed Jan. 5, 1960, Ser. No. 580
3 Claims. (Cl. 73—116)

This invention relates to an apparatus and method for imposing automatic control on operating equipment and processes. It relates particularly to an apparatus and method for imposing automatic control on operating equipment and processes in accordance with a previously determined and recorded program. It relates more particularly to such an apparatus and method whereby and wherein the previously determined program is recorded by modulating the profile of at least one cam element, and it relates still more particularly to the control of an internal combustion engine according to a previously determined and recorded program by an apparatus and method of the character aforesaid.

Research on fuels and lubricants has been hampered by the lack of wholly satisfactory laboratory engine test methods. As a result, a considerable portion of this research has had to be carried out in field tests which are both time consuming and costly. Generally, the laboratory engine tests have consisted of constant load and speed operation, and have been aimed at evaluating only one of the many fuel-lubricant performance factors. It is evident that a considerable economy in time and money could be effected in the laboratory procedure if an automotive engine could be operated in the laboratory in just the same way in which it is operated in a vehicle driven over an actual stretch or course of road.

According to this invention, an engine controller method and apparatus are provided which automatically put a laboratory engine through periods of idling, acceleration, coasting, and variations of load, speed, and torque corresponding to a schedule of conditions recorded in a vehicle operated over the road. The apparatus of this invention is particularly well suited to operate in conjunction with an eddy current dynamometer which can both electrically motor an an engine and absorb its power. In general, this apparatus exercises complete command over an engine on test by controlling its speed through a dynamometer and its load by means of automatic throttle positioning. With control over these two variables and also with provisions for notifying the dynamometer when to absorb power and when to motor or drive the engine, an operating schedule with time as the remaining variable can be obtained which will simulate field or road operation.

In a preferred apparatus embodiment and utilization of this invention, speed control is maintained by a translatory potentiometer riding on a cam. The potentiometer operates through the electronic control system of a dynamometer.

Infinite variability of the engine throttle is achieved by means of an electric motor operating through an amplifier controlled by another translatory potentiometer riding on a second cam. The signal to the amplifier is the unbalance of a Wheatstone bridge circuit comprising two fixed resistors, the translatory potentiometer, and a potentiometer mounted on the throttle shaft, the potentiometers being used as variable resistors.

Selection of power absorption or motoring is effected through the dynamometer control system by means of microswitches tripped by pins on the side of the throttle positioning cam. Ignition is maintained during motoring, and a safety device is included so that motoring of the engine can occur only when the throttle is closed.

Time control is maintained by the cams, microswitch adjustments, and three variable timers in the form of timer relays to be set according to desired conditions of idling, motoring, and road load.

The nature and substance of this invention may be more clearly perceived and fully understood by referring to the following description and claims taken in connection with the accompanying drawings in which:

FIG. 2 represents a side elevation view in mechanical component form of the engine, dynamometer, and tachometer generator of FIG. 1;

FIG. 3 represents an end elevation view of the eddy current dynamometer taken along line 3—3 in FIG. 2;

Figure 7:
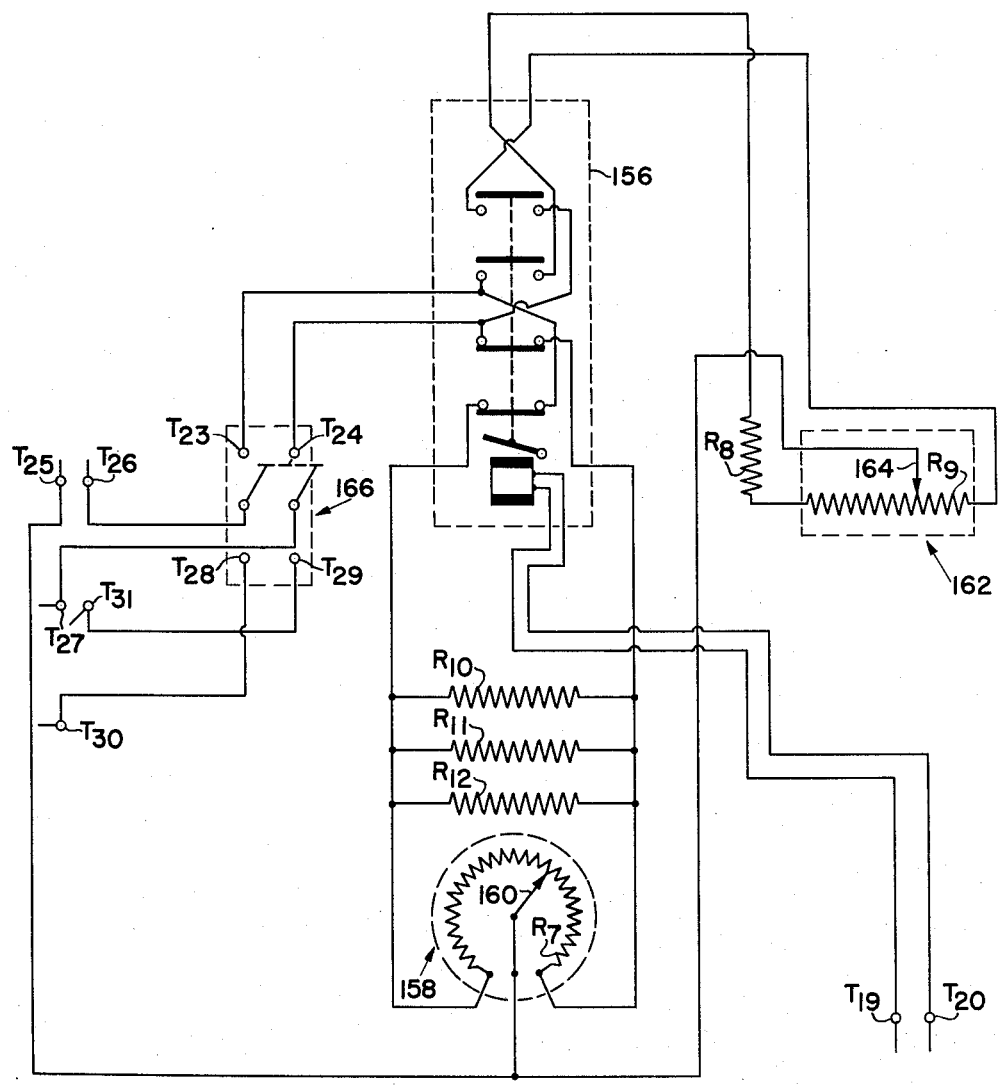
FIG. 7 represents a schematic diagram of the dynamometer control circuit of the engine controller of this invention.
Figure 8:
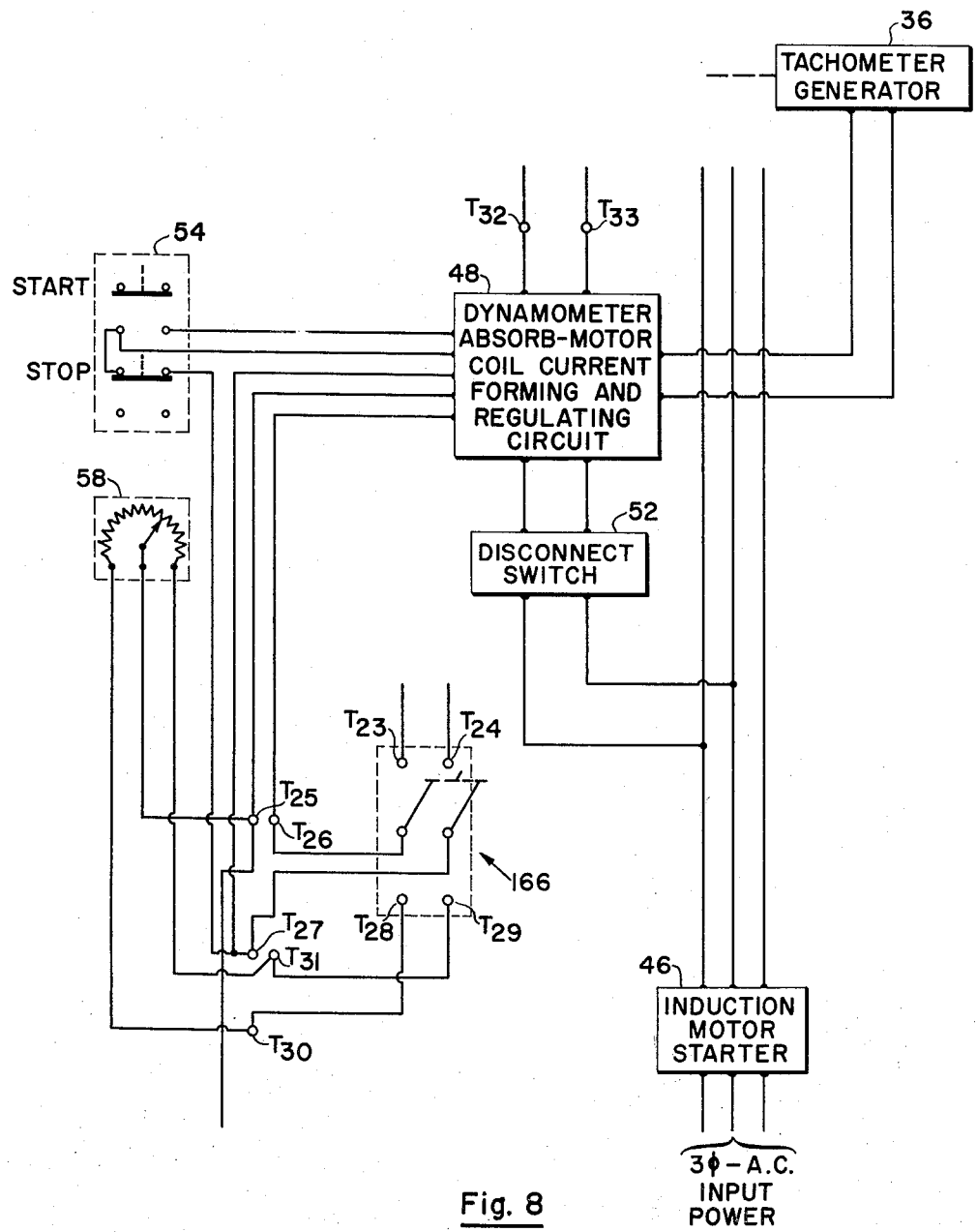
Figure 9:
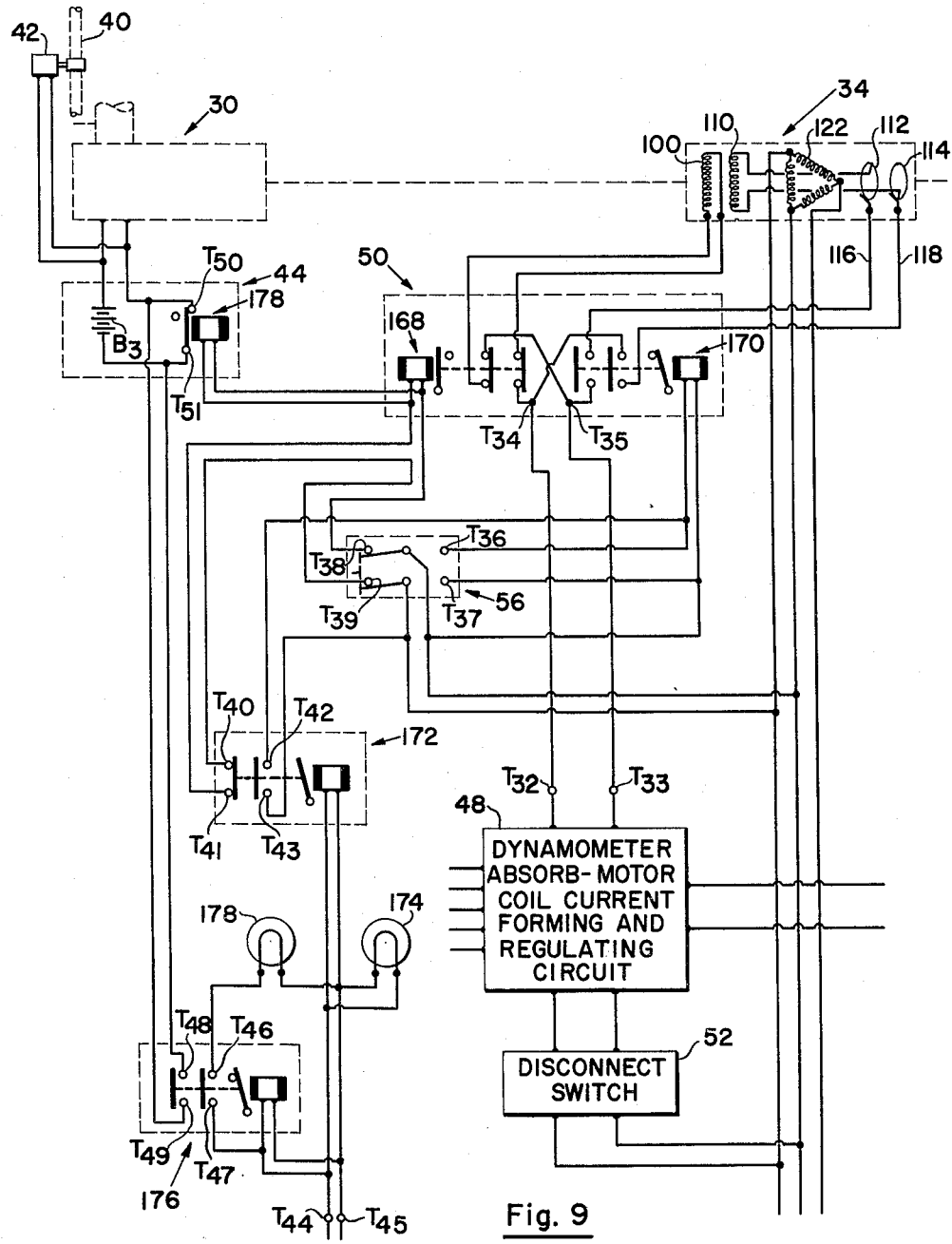
Figure 10:
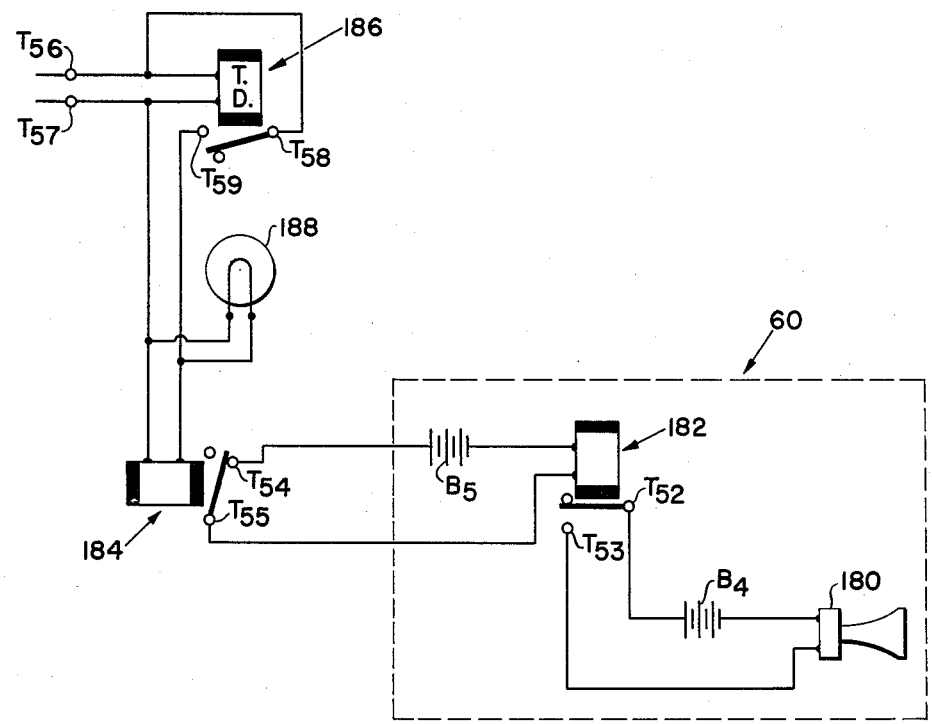
Figure 11:
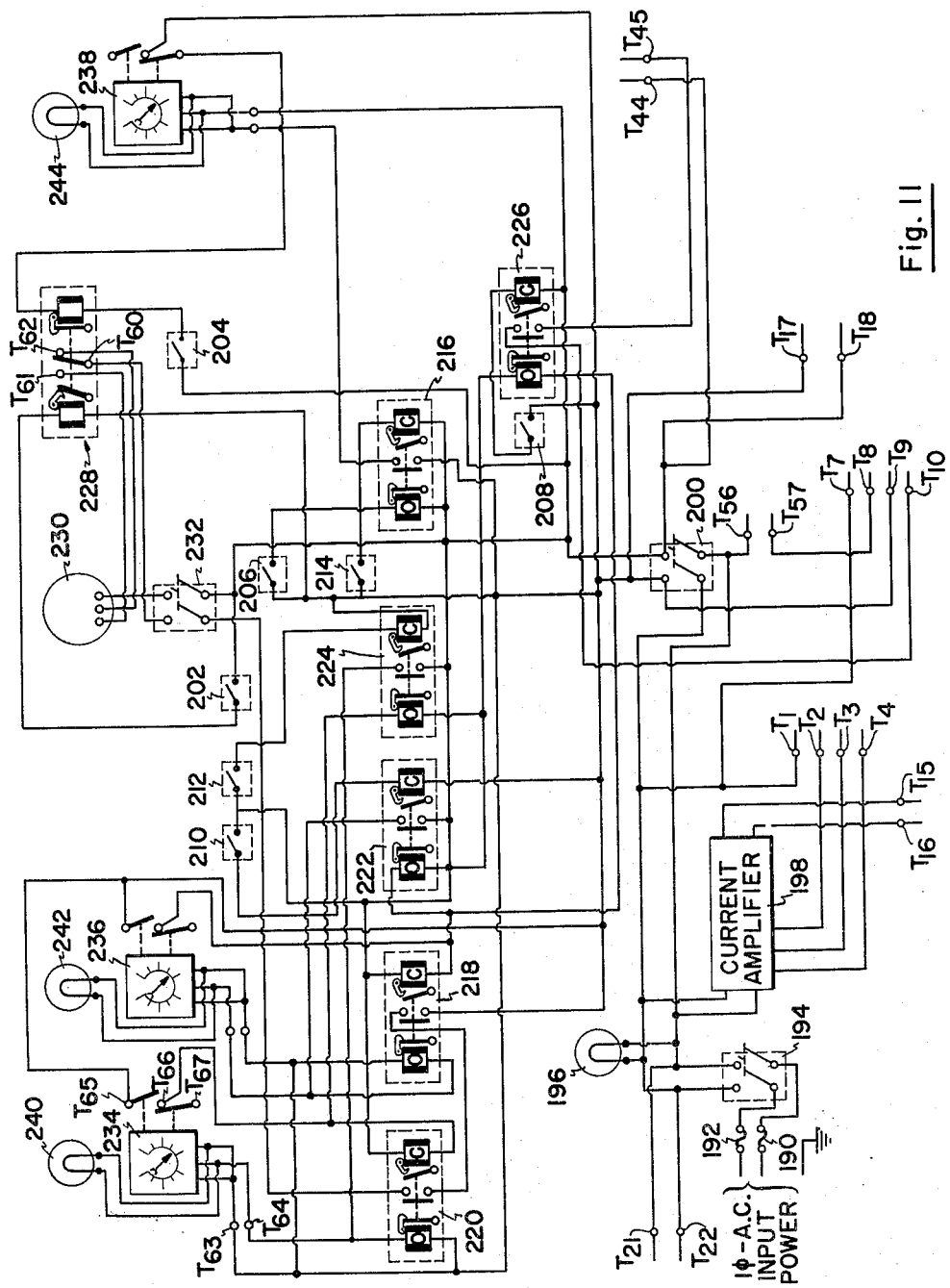
Figure 12:
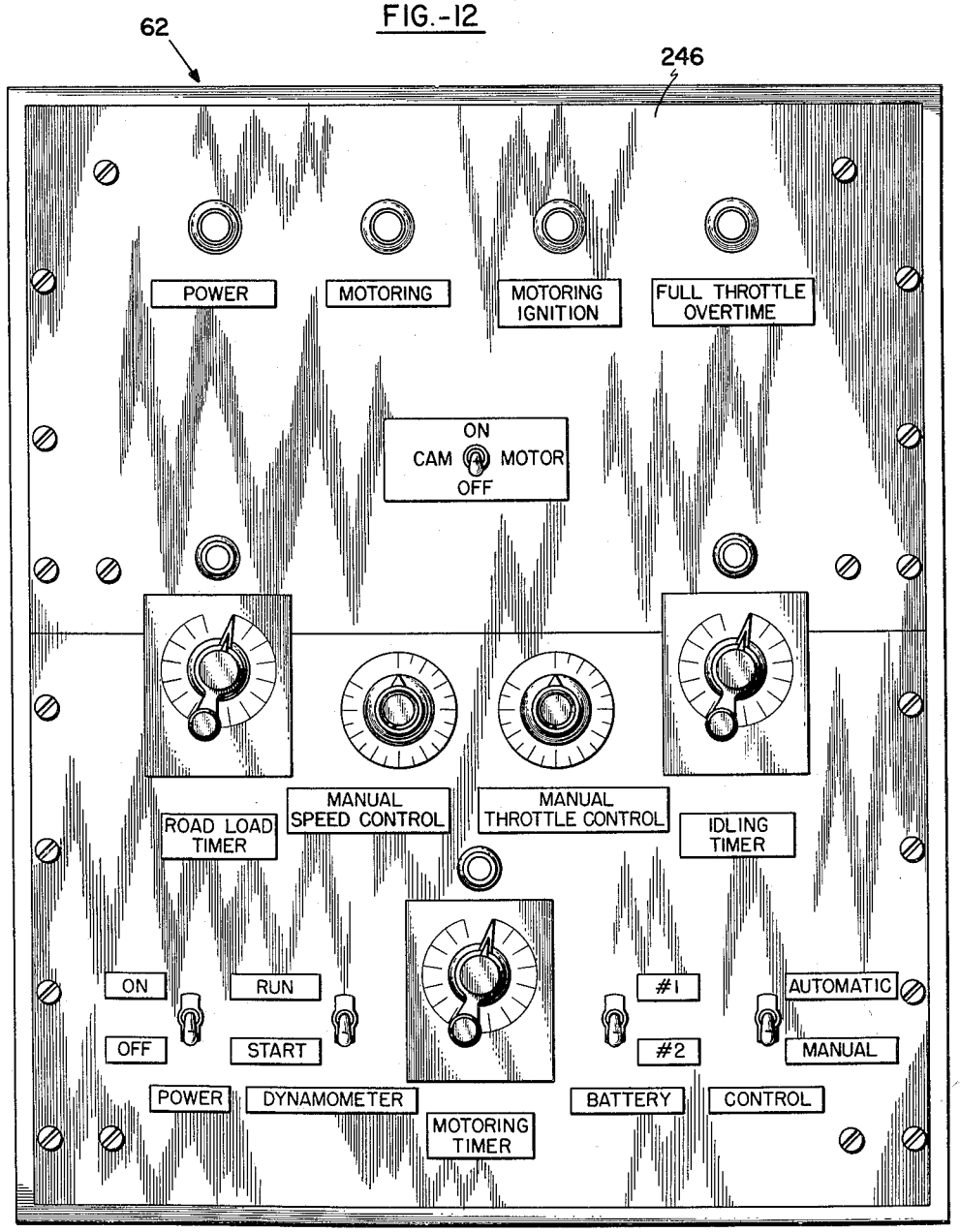
Figure 13:
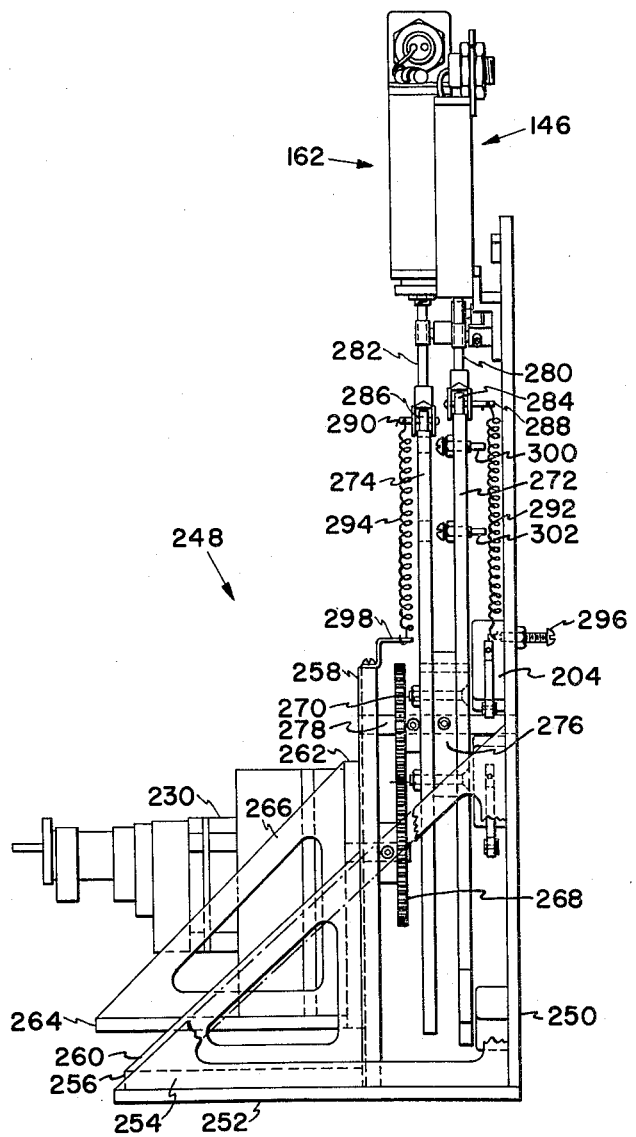
Figure 14:
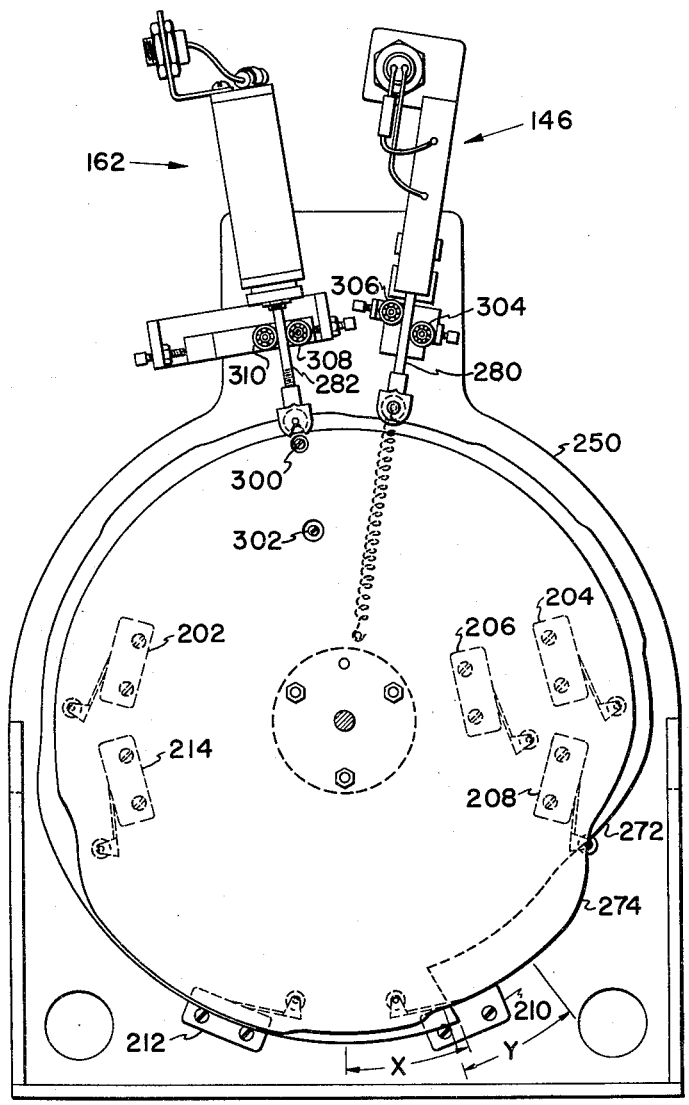
Figure 15:
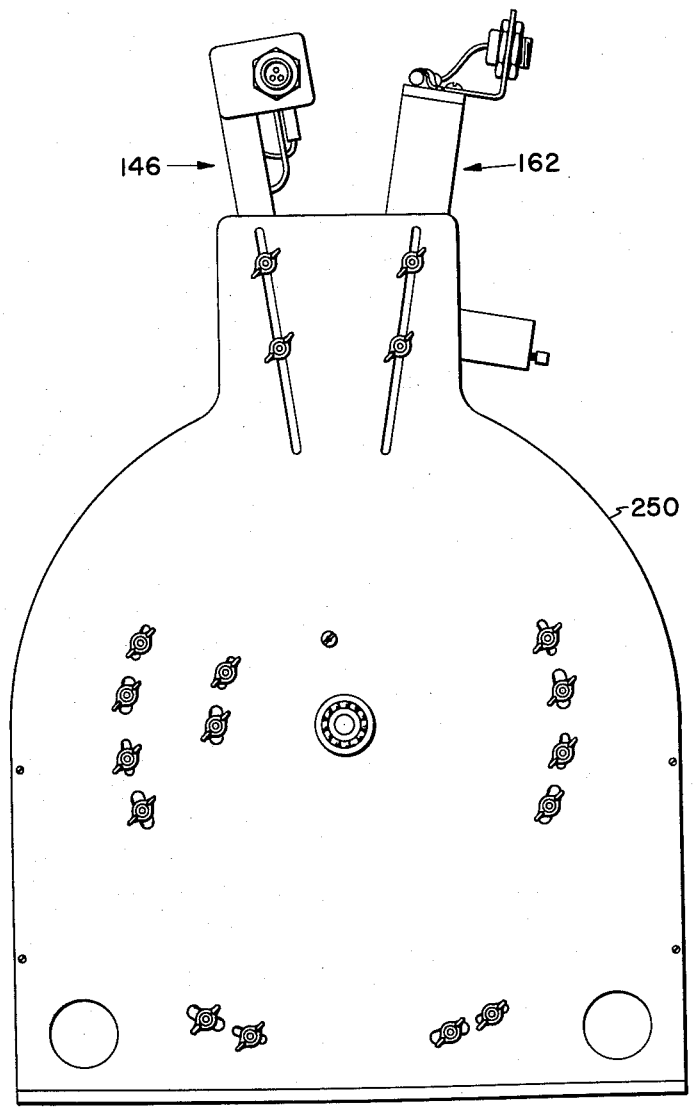

FIG. 8 represents a schematic diagram of the connections between the control circuit of FIG. 7 and the dynamometer coil current forming and regulating circuit, showing further the connections to the latter circuit from the tachometer generator, and showing still further the means whereby the circuit of FIG. 7 may be bypassed to allow control of the dynamometer coil current forming and regulating circuit by a potentiometer outside the engine controller of this invention;

FIG. 9 represents a schematic diagram of the connections between the dynamometer coil current forming and regulating circuit and the dynamometer through the absorb-motor selector, and showing further the ignition and motoring control circuits associated with the engine controller of this invention;

FIG. 10 represents a schematic diagram of the full throttle audible warning system associated with the engine controller of this invention;

FIG. 11 represents a schematic diagram of the general relay system of the engine controller of this invention;

FIG. 12 represents a front elevation view of the engine controller of this invention showing the control panel thereof;

FIG. 13 represents a right hand side elevation view of the cam mechanism of the engine controller of this invention removed from its cabinet and without wiring, certain parts of this mechanism being broken away for clarity of illustration;

FIG. 14 represents a back elevation view of the cam mechanism shown in FIG. 13 with the cam motor and certain motor supporting structure and power transmission gearing removed; and FIG. 15 represents a front elevation view of the cam mechanism shown in FIG. 13.

Preliminarily to providing a detailed description of these drawings, especially of FIGS. 1, 2, 5, and 9 thereof, it is desired that note be taken that whereas the engine or engine component particularly shown therein is or is suitable to be part of a spark-ignition, internal combustion machine whose power is regulated primarily by control of air flow, this showing is only by way of example and not of limitation of the present invention. An internal combustion engine of the compression-ignition variety, that is, a diesel, could equally well be shown. Likewise, an external combustion machine such as a Stirling or Philips engine could be portrayed in the control system of this invention. Power output of diesel, Stirling, and Philips engines is regulated primarily by control of fuel flow. In the broadest sense of this invention, however, the engine or engine and dynamometer illustrated in the several drawings are intended to be simply representative of dynamically functioning, externally controllable apparatuses generally.

Figure 1:
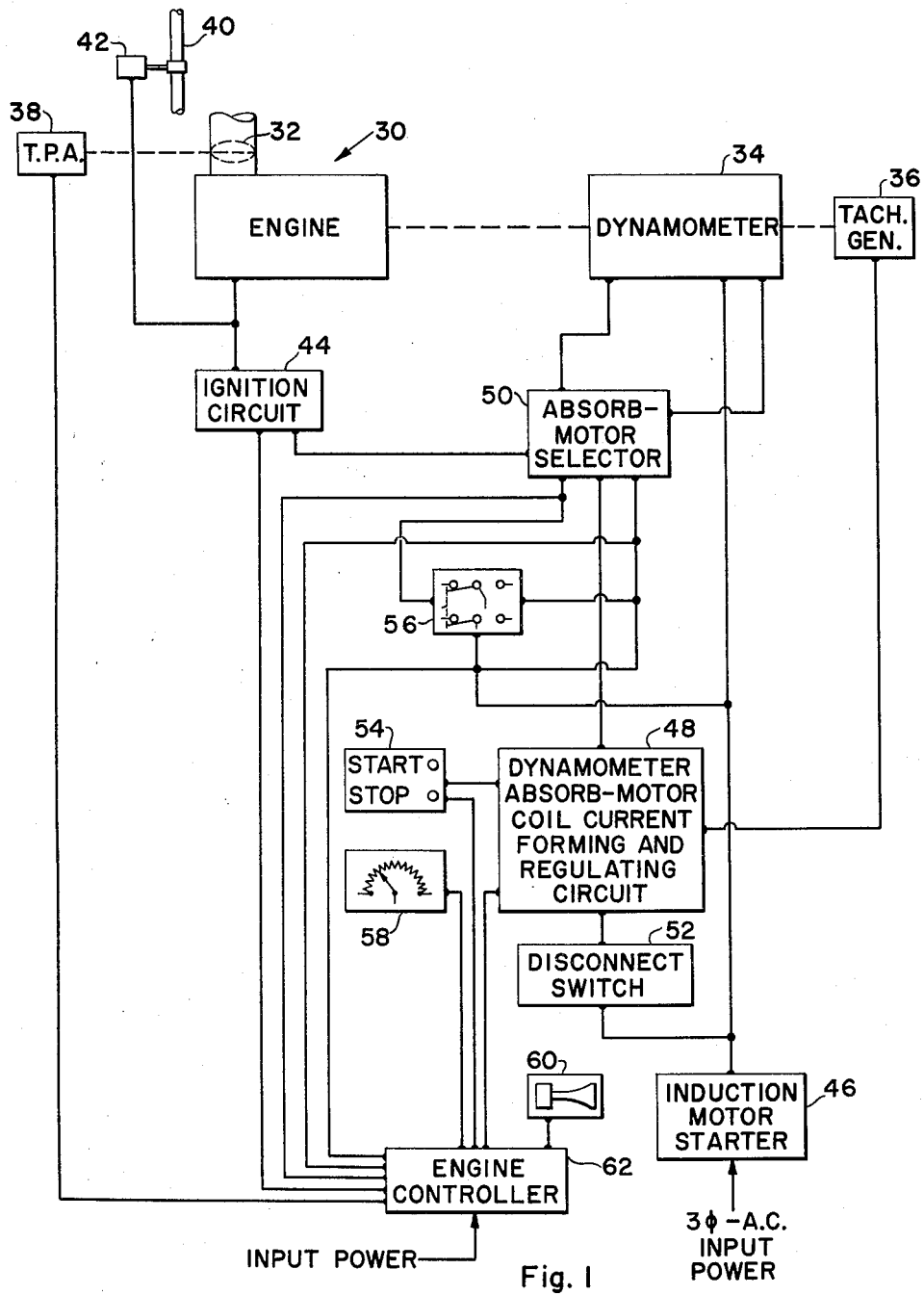
FIG. 1 represents a block and line diagram of the engine controller apparatus of this invention connected to a test engine and an eddy current dynamometer.

Referring now in detail to the drawings, especially to FIG. 1, thereof, an internal combustion engine 30 having a carburetor apparatus containing a tiltably mounted throttle plate 32 is connected mechanically through appropriate shafting to an eddy current dynamometer 34. Also connected by shafting to the dynamometer is tachometer generator 36. A throttle positioning apparatus 38 is connected mechanically to the shaft of throttle plate 32. Dynamometer 34, as will be explained in greater detail presently, is designed to be capable of either absorbing power from engine 30 or supplying power to the engine, that is, motoring the engine.

Associated with the engine is a fuel line 40 containing a solenoid-operated valve 42. Also associated with the engine, assuming it to be a spark ignition machine, is an ignition circuit 44. Associated with the dynamometer are an induction motor starter 46, an absorb-motor coil current forming and regulating circuit 48, and an absorb-motor selector 50. Starter 46 may be of any standard design appropriate for use with the induction motor component of the dynamometer. Current forming and regulating circuit 48 has at least the function of rectifying and smoothing alternating current from starter 46 to provide direct current for the absorbing and motoring coils in the dynamometer. Absorb-motor selector 50 is a switching means for sending output current from circuit 48 through either the absorbing or the motoring coils of the dynamometer in response to an appropriate control signal. A disconnect switch 52 of any suitable design is interposed between starter 46 and current forming and regulating circuit 48. Associated with circuit 48 is a start-stop controller 54, and associated with absorb-motor selector 50 is an external manual switch 56.

The remaining apparatus items appearing in FIG. 1 are a potentiometer 58, a full throttle audible warning system 60, and the engine controller 62 of this invention. This controller is connected electrically to throttle positioning apparatus 38, ignition circuit 44, current forming and regulating circuit 48, absorb-motor selector 50, potentiometer 58, and audible warning system 60. As will be shown presently, there is no regulating relation between potentiometer 58 and engine controller 62. Potentiometer 58 may be located at the console of an engine test cell control station of standard design. The buttons of start-stop controller 54, and warning system 60 may also be located at such a console. When controller 62 is operating to control the current forming and regulating circuit 48, potentiometer 58 is completely isolated. On the other hand, upon operation of appropriate switching means within controller 62 control of circuit 48 may be transferred entirely to potentiometer 58. The structure and functions of the several apparatus items appearing in FIG. 1 will be more completely explained in connection with the subsequent figures.

Referring next to FIGS. 2 and 3, engine 30 has an output shaft 64 which is coupled to shaft 66 of eddy current dynamometer 34. As has been mentioned already, eddy current dynamometer 34 is of a kind which may either absorb power from engine 30 or supply power to the engine. The latter utilization would correspond to motoring of an engine in the course of starting or in an automobile going downhill. Tachometer generator 36 is coupled to the end of shaft 66 opposite from engine 30.

Dynamometer 34 is characterized by a frame 68 and a pair of balance arms 70 and 72 oppositely disposed on the frame. It is supported by a pair of roller cradles 74 and 76. Bearing upon the upper surfaces of the balance arms are two compression springs 78 and 80. These springs surround tension posts 82 and 84 which are provided with suitably firm anchorage in the supporting floor structure 86, and pass upwardly through clearance holes in balance arms 70 and 72. The tension posts are threaded at their upper ends to receive adjusting nuts 88 and 90 whereby initial compression is set on springs 78 and 80. By this roller cradle, balance arm, and spring arrangement, dynamometer frame 68 is given a slight amount of rotational freedom. The frame will tend to turn one way or the other depending upon whether the dynamometer is absorbing power from or supplying power to engine 30. Angular deflection of frame 68 in cradles 74 and 76 will be a measure of torque.

Figure 4:
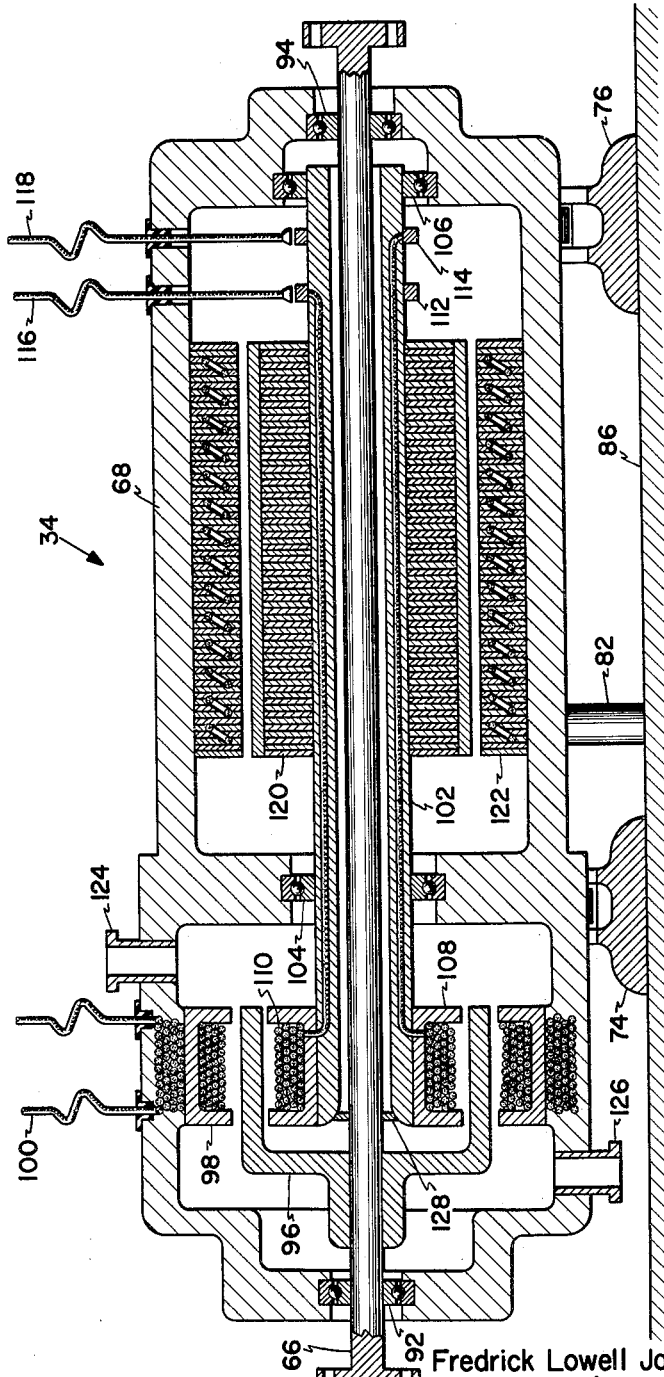
FIG. 4 represents a side elevation view in section of the eddy current dynamometer taken along line 4—4 in FIG. 3.

Referring next to FIG. 4, dynamometer shaft 66 is supported in bearing sets 92 and 94 retained in frame 68. Fitted fixedly to the shaft, which may itself be of any grade of steel or other material suitable for use as shafting in rotating electrical machinery, is a flanged or cup-like disc 96 which must be of a material such as soft iron having a high magnetic permeability. Set in frame 68 adjacent the flange periphery of disc 96 are a series of C-shaped magnetically permeable pole pieces 98 each having a magnetizing winding of insulated wire 100. The leads of these several windings may be joined electrically as appropriate, and taken to a common current source.

Enclosing shaft 66 for at least a portion of its length is a sleeve 102 which is supported in bearing sets 104 and 106 retained in frame 68. At its end adjacent disc 96 the sleeve is fixedly fitted with a series of C-shaped magnetically permeable pole pieces 108. Around these pole pieces is a magnetizing winding of insulated wire 110 whose ends are taken longitudinally through sleeve 102 to slip rings 112 and 114 nearby bearing 106. External electrical connection is made to these slip rings through insulated leads 116 and 118 which terminate in brushes of a conventional nature running on the rings.

Fixedly mounted on sleeve 102 between bearing 104 and slip ring 112 is the rotor structure 120 for an induction motor. Such structure may take several forms. One of these is that of copper bars embedded in slots in a laminated iron core, and connected at each end of the rotor by copper rings. Set in frame 68 adjacent the periphery of rotor structure 120 is an induction motor stator structure 122. This comprises a three-phase Y or delta-connected winding embedded in the slots of a laminated iron core. The leads coming off of this stator structure should be considered as having appropriate electrical connection in either Y or delta, and supplied with A.C. power from an appropriate source, for example, a source at 440 volts.

The induction motor comprising rotor structure 120 and stator structure 122 may be air cooled while the region of the eddy current dynamometer to the left of bearing 104 may be liquid cooled. Conduit 124 is a means of cooling liquid or water supply, and conduit 126 is a means of cooling water discharge. The cooling water carries away heat from windings 100 and 110, and particularly from the flange element of disc 96. Bearings 92 and 104 should be considered as sealed to prevent water flow through them out along shaft 66 or in to the induction motor apparatus, and a rotating seal 128 is provided between shaft 66 and sleeve 102.

The eddy current dynamometer is an article of commerce. For an example of a machine generally similar to the one just described, reference may be had to Catalog GBI (August 1952) of the Dynamatic Corporation (a subsidiary of the Eaton Mfg. Co.) of Kenosha, Wis. At page 13 of this catalog is illustrated and described the "Universal Dynamometer" which it is said combines the functions of motoring and absorption in one machine cradled in trunnion bearings.

The principles of operation of the eddy current dynamometer will now be considered. Suppose that internal combustion engine 30 is still, and that there is a direct current flowing through coils 100 but no current flowing through coil 110. A field of magnetic flux will be set up between the north and south faces of pole pieces 98, the lines of which flux will pass at least in part through the magnetically permeable flange material of disc 96. Now suppose that engine 30 is started to commence rotation of shaft 66 and disc 96. There will be relative movement of the lines of magnetic flux in the disc flange which will create eddy currents therein. These currents will develop a second magnetic field whose strength will be determined by the strength of the primary field owing to the current in coils 100 and by the relative speed between disc 96 and pole pieces 98.

There will be attraction between the primary and secondary magnetic fields, the overcoming of which will require the exertion of engine torque on shaft 66. For a given speed, this torque will increase with increasing current in coils 100. Power developed by the engine appears as heating of disc 96. The disc is prevented from overheating by water flowing into the dynamometer through conduit 124 and out through conduit 126.

Suppose next that the engine is still, and that there is a direct current flowing through coil 110 but no current flowing through coils 100. Suppose further that current is supplied to the stator structure 122 of the induction motor to commence turning of the rotor structure 120 and sleeve 102 carrying pole pieces 108, coil 110, and slip rings 112 and 114. According to principles stated already, there will be a torque exerted on the flange element of disc 96 which will be transmitted back through shaft 66 to engine 30 to motor the engine.

The induction motor element of the eddy current dynamometer will be an essentially constant speed device. For a given speed of this motor, the tightness of coupling between pole pieces 108 and disc 96 and hence the motoring speed of disc 96 and engine 30 will increase with increasing current in coil 110. With the direct connection between engine 30 and disc 96 as shown, the engine cannot, of course, be motored at a speed greater than that of the induction motor itself with no firing impulses in the engine cylinders. The difference in speed between disc 96 and pole pieces 108 is called slip.

Pure motoring of the engine with no cylinders firing corresponds only to starting conditions or to downhill operation of an automotive vehicle under the action of gravity alone. Motoring of the engine with simultaneous firing impulses corresponds to downhill operation of an automotive vehicle under its own power. Speeding up of the engine under its own power might bring disc 96 to a higher speed than pole pieces 108, in which case the eddy current torque conditions would reverse with the engine trying to overspeed the induction motor and drive it as a generator. This would, however, correspond to no practical operating condition. Likewise, acceleration of the engine by action of the induction motor with coil 110 energized simultaneously with restraint of the engine by action of energized coils 100 would be an unrealistic operation. For this reason, coils 100 and 110 do not carry current at the same time. There may, however, always be power to the stator element 122 of the induction motor whether or not coil 110 is energized.

Figure 5:
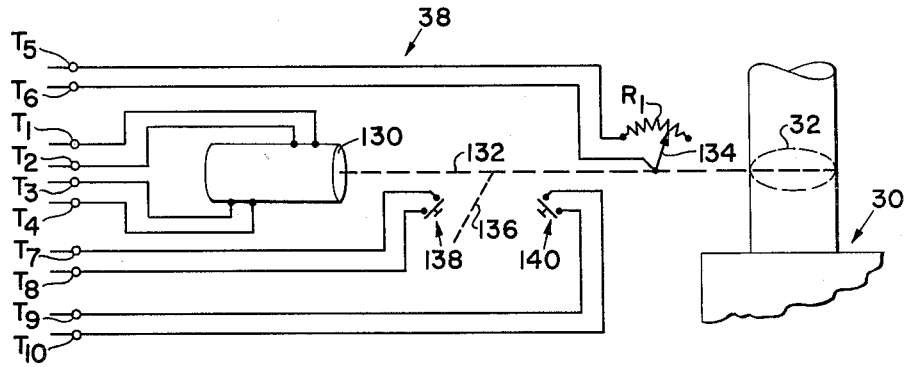
FIG. 5 represents a schematic diagram of the throttle positioning apparatus.

Referring next to FIG. 5, the throttle positioning apparatus generally designated 38 comprises a brushless, reversible, variable speed induction motor 130 having an output shaft 132 which is connected to throttle plate 32. A machine suitable for motor 130 is Brown Balancing Motor #76,750–3, manufactured by the Minneapolis-Honeywell Regulator Company, Philadelphia, Pa. The motor includes suitable speed reducing gearing to give a turning rate of its shaft 132 comparable to that of those in automotive vehicle carburetors in road service. This shaft is fixedly fitted with a rheostat slider 134 and a limit switch arm 136. Slider 134 is in electrical contact with rheostat resistor $R_1$, and moves along it as shaft 132 is rotated. Switch arm 136 is so disposed on shaft 132 that it will bear on the push buttons of limit switches 138 and 140 at the extreme positions of angular travel of throttle plate 32. The switch arm will close switch 138 when plate 32 is in the wide open or full throttle position, and it will close switch 140 when plate 32 is in the closed or idle throttle position. Unless closed by action of arm 136, both switches 138 and 140 will be normally open.

Induction motor 130 has two stator windings. One of these is continuously energized by current from a line source. The other winding is energized by current from a power amplifier. The motor is phase-sensitive; that is, its direction of rotation is determined by the phase relation between the amplifier output current and the line current. Electrical connections to one stator winding of motor 130 are brought out to terminals $T_1$ and $T_2$, and those to its other stator winding to terminals $T_3$ and $T_4$. Terminals $T_5$ and $T_6$ serve resistor $R_1$ and slider 134 respectively. The terminals of limit switch 138 are $T_7$ and $T_8$, and those of switch 140 are $T_9$ and $T_{10}$. The functions of all components of throttle positioning apparatus 38 will be related to engine controller 62 presently.

Figure 6:
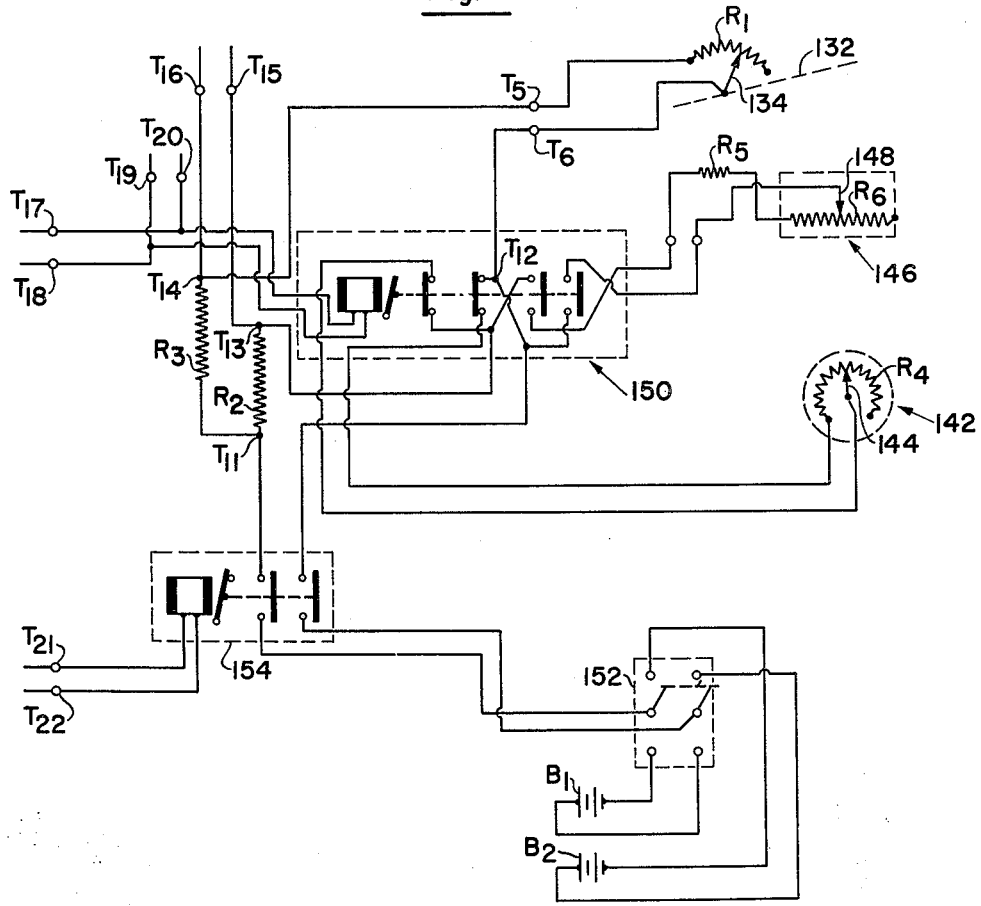
FIG. 6 represents a schematic diagram of the throttle positioning apparatus Wheatstone bridge circuit of the engine controller of this invention.

Referring next to FIG. 6, the electrical apparatus shown schematically therein and comprising the Wheatstone bridge circuit of the throttle positioning apparatus is all located physically in engine controller 62 with the exception of resistor $R_1$ and slider 134 mounted on shaft 132. These latter parts, of course, are found in the throttle positioning apparatus. In FIG. 6, the four junctures of the bridge are designated $T_{11}$, $T_{12}$, $T_{13}$ and $T_{14}$. A voltage source is connected across junctures $T_{11}$ and $T_{12}$, and when the bridge is out of balance it will supply an output voltage across junctures $T_{13}$ and $T_{14}$. Leads from the latter two bridge junctures are taken out to terminals $T_{15}$ and $T_{16}$.

Two legs of the bridge are fixed and equal resistors $R_2$ and $R_3$ which may each be 2,200 ohms, for example. A third leg of the bridge is that part of resistor $R_1$ which is effective according to the position of slider 134 upon it. In keeping with the aforesuggested values for $R_2$ and $R_3$, $R_1$ may have a total value of about 2,000 ohms. The fourth leg of the bridge may be either rheostat 142 comprising resistor $R_4$ and slider 144 or else fixed resistor $R_5$ in series with rheostat 146 comprising resistor $R_6$ and slider 148. Appropriate values for resistors $R_4$, $R_5$, and $R_6$ respectively, are 2,000 ohms, 270 ohms, and 1,000 ohms.

Whether the bridge circuit contains rheostat 142 or resistor $R_5$ and rheostat 146 will depend upon the position of relay 150 having coil terminals $T_{17}$ and $T_{18}$. The construction of relay 150 is such that in the absence of current in its coil element it will be normally closed in a direction to bring rheostat 142 into the bridge circuit. As will be made more clear presently, use of resistor $R_5$ and rheostat 146 corresponds to automatic operating control of an engine under test, while use of rheostat 142 corresponds to manual control. In connection with relay 150, note should be taken of the two electrical lines having terminals $T_{19}$ and $T_{20}$ which are tapped off of the relay coil leads. These lines go to the dynamometer control circuit which is illustrated in FIG. 7, and which will be discussed presently.

Energization of the bridge circuit of FIG. 6 is furnished by either battery $B_1$ or battery $B_2$ according to the position of double pole, double throw switch 152. These two batteries are provided in parallel arrangement to allow continuity of engine operation without shutdown for battery replacement. The battery connection in the bridge circuit is completed through relay 154 having coil terminals $T_{21}$ and $T_{22}$. The means of supplying current to coil elements of both relays 150 and 154 are shown in and will be discussed in connection with FIG. 11 illustrating the general relay system of the engine controller.

A circuit is completed from the Wheatstone bridge output terminals $T_{15}$ and $T_{16}$ to the power amplifier mentioned above in connection with motor 130 of the throttle positioning apparatus. This amplifier and electrical connections to it are shown in FIG. 11. Its operation may be discussed to some extent here, however, to facilitate discussion of the apparatus shown in FIGS. 5 and 6.

Suppose that the bridge circuit of FIG. 6 is initially in balance, the criterion of balance being that junctures $T_{13}$ and $T_{14}$ and, therefore, output terminals $T_{15}$ and $T_{16}$ are at the same potential. Suppose next that the bridge is unbalanced by displacement of slider 148 on resistor $R_6$ of rheostat 146. An output voltage signal will appear across terminals $T_{15}$ and $T_{16}$, and be impressed on the current amplifier. The polarity of this signal will depend upon the direction of bridge unbalance. Depending upon this polarity in turn, the stator coil of motor 130 which is energized from the amplifier will have a current passed through it which either leads or lags the line current in the other stator coil. A leading amplifier output current will cause rotation of motor 130 in one direction and a lagging current will cause reverse rotation of the motor. In either case, motor output shaft 132 will be turned shifting slider 134 along resistor $R_1$ in such direction to restore the bridge to a balanced condition, attenuate the input signal to the amplifier, and finally stop the motor. In the process of rebalancing the bridge, of course, the position of throttle plate 32 in the carburetor apparatus of engine 30 will be changed.

Referring next to FIG. 7, the electrical apparatus shown schematically therein and comprising the dynamometer control circuit is all located physically in engine controller 62. Terminals $T_{19}$ and $T_{20}$ previously shown in FIG. 6 appear in FIG. 7, and provide points of relationship of the circuits of the two figures. In FIG. 7, $T_{19}$ and $T_{20}$ constitute the terminals of the coil element of relay 156. One side of this relay is connected across the resistor element terminals of rotary potentiometer 158 comprising resistor $R_7$ and slider 160. The other side of relay 156 is connected across the series combination of resistor $R_8$ and the resistor element of linear potentiometer 162 which comprises resistor $R_9$ and slider 164. Depending on which way relay 156 is closed, either $R_7$ or $R_8$ and $R_9$ will be connected across terminals $T_{23}$ and $T_{24}$ of double pole, double throw switch 166.

The construction of relay 156 is such that in the absence of current in its coil element it will be normally closed in a direction to bring resistor $R_7$ of potentiometer 158 into the dynamometer circuit. As will be made more clear presently, use of resistor $R_8$ and potentiometer 162 corresponds to automatic operating control of an engine under test, while use of potentiometer 158 corresponds to manual control. Appropriate values for resistors $R_7$, $R_8$, and $R_9$ respectively are 20,000 ohms, 1,000 ohms, and 5,000 ohms. Three fixed resistors $R_{10}$, $R_{11}$, and $R_{12}$ each of about 20,000 ohms are connected in parallel across $R_7$.

The two potentiometer slider elements 160 and 164 are brought out to a common terminal $T_{25}$. The pivot or central connections of switch 166 are brought out to terminals $T_{26}$ and $T_{27}$, while switch terminals $T_{28}$ and $T_{29}$, the pair opposite $T_{23}$ and $T_{24}$, are brought out to exterior terminals $T_{30}$ and $T_{31}$. As will be made more clear presently, closure of switch 166 on terminal pair $T_{23}$ and $T_{24}$ completes the electrical connection between the circuit of FIG. 7 and the dynamometer absorb-motor coil current forming and regulating circuit 48. On the other hand, as will also be more clearly pointed out presently, closure of switch 166 on terminal pair $T_{28}$ and $T_{29}$ places the current forming and regulating circuit 48 under the control of potentiometer 58 shown in FIG. 1.

Referring next to FIG. 8, the connections from start-stop controller 54 and potentiometer 58 to the dynamometer control circuit of engine controller 62 are shown in full. Start-stop controller, which may be located at an engine test cell control station console, is a three-connection unit with two leads going to the dynamometer absorb-motor coil current forming and regulating circuit 48, and the other lead going to terminal $T_{27}$ shown earlier in FIG. 7.

The center or slider tap of potentiometer 58 is connected to terminal $T_{25}$ which is in a common line from slider elements 160 and 164 of potentiometers 158 and 162. The resistor element leads from potentiometer 58 are connected to terminals $T_{30}$ and $T_{31}$, and hence are connected to terminals $T_{26}$ and $T_{27}$ whenever switch 166 is closed on terminals $T_{28}$ and $T_{29}$. From terminals $T_{25}$, $T_{26}$, and $T_{27}$ lines run uninterruptedly to the dynamometer coil current forming and regulating circuit 48. Thus it is evident that switch 166 may be manipulated to connect the coil current forming and regulating circuit with either the dynamometer control circuit of FIG. 7 within engine controller 62 or potentiometer 58 which, like start-stop controller 54, may be at a control station console.

The dynamometer absorb-motor coil current forming and regulating circuit 48 receives its alternating current power input through disconnect switch 52 from connections taken across two of the three main power lines going to the induction motor component of eddy current dynamometer 34. Circuit 48 receives one signal input from tachometer generator 36. It receives what is, in effect, another signal input across terminals $T_{25}$ and $T_{26}$ according to the setting of whichever one of three potentiometers, 58, 158, or 162, is in active use. The output of circuit 48 is a direct current taken out on two lines containing terminals $T_{32}$ and $T_{33}$, and extending to absorb-motor selector 50 shown in FIG. 1.

It is evident that coil current forming and regulating circuit 48 must act first of all as a rectifier to provide a direct current output from an alternating current input. It must further have internal control features so that the proper amount of direct current will be provided to give the tightness or looseness of clutch action, that is, the degree of slip, appropriate to the desired speed and torque of engine 30 coupled to dynamometer 34.

For an example of such a circuit and one of a nature generally suitable for use in connection with the present invention, reference may be had to Bulletin GC-1 (February 1952) of the Dynamic Corporation (a subsidiary of the Eaton Mfg. Co.) of Kenosha, Wisconsin. This whole bulletin is concerned with describing and illustrating electronic controls for "Dynamatic" couplings and brakes. A circuit particularly appropriate to serve as dynamometer coil current forming and regulating circuit 48 is shown on the inside back cover of this bulletin.

In general, this "Dynamatic" circuit employs a gas-filled triode or thyratron tube as a power rectifier. The grid bias voltage of this tube whereby its conducting period is determined comprises a direct or steady component and an alternating or rider wave component superimposed thereupon. The level of the direct component is determined by the setting of an external potentiometer such as 58, 158, or 162, and by the rectified voltage output of tachometer generator 36. The effects of the external potentiometer and the tachometer generator upon the direct component of the thyratron grid bias voltage are in opposition. The reason for this will be shown by an operating example.

Suppose that dynamometer 34 is motoring engine 30, and it is desired to increase the motoring speed. The external potentiometer 58, 158, or 162 will be shifted in a direction to raise the level of the direct component of thyratron grid bias voltage. Raising of this component will cause the alternating component riding the direct component to exceed the critical grid voltage of the tube, the minimum grid bias value at which the thyratron will ionize to conduct a current, at an earlier point in the positive half wave cycle of voltage impressed between the tube's anode and cathode elements. With a longer period of conduction through the thyratron, the output current of circuit 48 circulated through motoring coil 110 of dynamometer 34 is increased. With increase of this current, the clutching action of the dynamometer is tightened.

The speed of disc 96, shaft 66, and engine 30 is brought closer to that of rotor element 120 of the induction motor.

As shaft 66 is speeded up, not only engine 30 but also tachometer generator 36 will be driven faster. This will cause an increase in the voltage output of the tachometer. Upon proper rectification, this voltage will be matched against that applied to the thyratron grid according to the setting of the external potentiometer, and tend to reduce the net direct component of grid bias voltage. As the motored engine 30 and tachometer generator 36 approach the desired motoring speed, the grid bias voltage limiting effect of the tachometer will become increasingly great. This effect will tend to diminish the output current of circuit 48, and relax the clutching effect of the dynamometer as a new balance point of speed and torque is approached. If engine 30 is overspeeded in motoring, the still-increasing voltage output of the tachometer will act to reduce the current in motoring coil 110 and, consequently, reduce the engine speed. Likewise when the external potentiometer 58, 158, or 162 is shifted to reduce the motoring speed, the falling off in voltage from tachometer generator 36 as this machine slows down with engine 30 will tend to retard reduction of the net direct component of grid bias voltage on the thyratron, and so prevent underspeeding.

Referring next to FIG. 9, the output lines of dynamometer absorb-motor coil current forming and regulating circuit 48 carrying direct current proceed from terminals $T_{32}$ and $T_{33}$, shown in FIG. 8, to terminals $T_{34}$ and $T_{35}$ within absorb-motor selector 50. This selector contains two relay units 168 and 170, each of which acts as a double-pole, single throw switch. When there is current in the coil element of relay 168, connections will be completed from terminals $T_{34}$ and $T_{35}$ to absorbing coils 100 of dynamometer 34. Similarly, when there is current in the coil element of relay 170 terminals $T_{34}$ and $T_{35}$ will be connected to motoring coil 110 of the dynamometer.

Manual switch 56 associated with absorb-motor selector 50 may be located at the console of an engine test cell control station. When this switch is closed on its terminals $T_{36}$ and $T_{37}$, the coil element of relay 170 will be energized to complete connections between coil current forming and regulating circuit 48 and dynamometer motoring coil 110. On the other hand, when switch 56 is closed on its terminals $T_{38}$ and $T_{39}$, the coil element of relay 168 will be energized to complete connections between circuit 48 and dynamometer absorbing coils 100 provided that connection is made across terminals $T_{40}$ and $T_{41}$ of motoring relay 172 within engine controller 62.

When control of an engine 30 on test is to be shifted from manual regulating means at a test cell console to engine controller 62, switch 56 is thrown to close on its terminals $T_{38}$ and $T_{39}$. Control of absorb-motor selector 50 is then effected through relay 172. When this relay has no current in its coil element, connection will be made across its terminals $T_{40}$ and $T_{41}$ to energize relay 168 and send current from circuit 48 to absorbing coils 100 as stated above. On the other hand, when the coil element of relay 172 is energized, connection will be made across terminals $T_{42}$ and $T_{43}$ to close the circuit of the coil element of relay 170 and send direct current to motoring coil 110 in dynamometer 34. Energizing voltage for relay 172 is supplied across terminals $T_{44}$ and $T_{45}$. Means for providing this voltage will be discussed in connection with FIG. 11. A pilot light 174 connected across the leads of the coil element of relay 172 will glow when this coil is energized, and consequently be an indication that current is flowing through the dynamometer motoring coil 110.

Upon application of a voltage across terminals $T_{44}$ and $T_{45}$, current will flow not only in the coil element of motoring relay 172, but also in that of ignition relay 176 located in engine controller 62. Normally, that is without any current in its coil element, ignition relay 176 has an open circuit across both of its terminal pairs, $T_{46}$ and $T_{47}$, and $T_{48}$ and $T_{49}$. When the relay is energized, connection will be made across both of these terminal pairs at once. Upon closing of relay 176 across $T_{46}$ and $T_{47}$, a power circuit will be completed through pilot light 178, and upon closing of this relay across $T_{48}$ and $T_{49}$ a battery connection to engine 30 will be completed through ignition circuit 44.

Ignition circuit 44 contains a battery $B_3$. The connection of this battery to the spark system of engine 30 is interruptable across two pairs of terminals in parallel. One of these pairs comprises terminals $T_{48}$ and $T_{49}$ of relay 176 in engine controller 62. The other pair comprises terminals $T_{50}$ and $T_{51}$ of relay 178 in the ignition circuit itself. The leads from the coil element of relay 178 are connected in parallel with those from the coil of relay 168 in the absorb-motor selector 50. It may be seen, therefore, that the connection of battery $B_3$ to engine 30 will be completed whether or not a voltage is applied across terminals $T_{44}$ and $T_{45}$ in engine controller 62 so long as switch 56 is closed on its termnials $T_{38}$ and $T_{39}$. A connection from battery $B_3$ in parallel to that to engine 30 is made to solenoid-operated valve 42 in fuel line 40. Valve 42 is normally closed, and opens only to allow fuel to flow to the engine when the ignition circuit is completed across either terminals $T_{48}$ and $T_{49}$ or $T_{50}$ and $T_{51}$.

Referring next to FIG. 10, full throttle audible alarm system 60 includes an electric horn unit 180 connected to a battery $B_4$. The circuit through this horn and battery is interruptable across terminals $T_{52}$ and $T_{53}$ of relay 182, and is normally maintained in an interrupted condition as the coil element of relay 182 is energized by battery $B_5$. The circuit through relay 182 and battery $B_5$ itself interruptable across terminals $T_{54}$ and $T_{55}$ of relay 184 located in engine controller 62.

Whenever the throttle of engine 30 is opened fully, circuit and switching means to be more completely described presently will be closed to provide a voltage across the input terminals $T_{56}$ and $T_{57}$ of time delay relay 186 shown in FIG. 10 and located in the engine controller 62. The external terminals of this relay, $T_{58}$ and $T_{59}$, are normally open, but will be drawn closed after an energizing voltage has been applied across terminals $T_{56}$ and $T_{57}$ for a determined period of time, two minutes for example. A device suitable for relay 186 is Pneumatic Timer Relay, Bulletin 849—Style A, manufactured by the Allen-Bradley Co., New York, N. Y.

The coil element of relay 184 is connected in parallel with time delay relay 186 across terminals $T_{57}$ and $T_{57}$. One of the leads to the coil of relay 184 is, however, interruptable across terminals $T_{58}$ and $T_{59}$, and so relay 184 will be inactive even though there be voltage across $T_{56}$ and $T_{57}$ until the delay period of relay 186 has passed, and closure has been made across $T_{58}$ and $T_{59}$. Pilot light 188, in parallel with the coil element of relay 184, will be turned on as soon as the external terminals of the time delay relay are connected electrically. When relay 184 is energized at the end of the delay period, the circuit through battery $B_5$ and the coil element of relay 182 will be broken across terminals $T_{54}$ and $T_{55}$. Relay 182 will then move to effect closure across terminals $T_{52}$ and $T_{53}$, completing the circuit through battery $B_4$ and electric horn 180 to energize the latter device and give audible warning of the full throttle condition of engine 30.

Referring next to FIG. 11, single phase A.C. power is supplied to engine controller 62 through line fuses 190 and 192, and double pole, single throw switch 194. Pilot light 196 will be lit when switch 194 is closed. Upon closing of this switch, power is supplied to current amplifier 198. An apparatus suitable for amplifier 198 is Brown "Electronik" Continuous Balance Amplifier Unit #351921 including converter for Brown Amplifier #354210–1, all manufactured by the Minneapolis-Honeywell Regulator Company. Terminals $T_1$, $T_2$, $T_3$, and $T_4$ are indicated to show the power connections to the stator windings of balancing motor 130 of FIG. 5, one connection coming directly from the line after closure of switch 194, and the three others coming from amplifier 198. Terminals $T_{15}$ and $T_{16}$ are indicated to show input signal connection to the amplifier from the Wheatstone bridge circuit of FIG. 6. Terminals $T_{21}$ and $T_{22}$ are indicated to show the power connections to the coil element of relay 154 of the Wheatstone bridge circuit, this coil being energized from the line upon closure of switch 194.

The circuit through the coil element of time delay relay 186 will be completed upon the closing of line switch 194, except as it may be interrupted at full throttle limit switch 138. This circuit may be traced on FIGS. 5, 10, and 11 commencing at fuse 190. From this fuse the circuit extends through one side of line switch 194 to terminal $T_{56}$, from terminal $T_{56}$ through the coil of time delay relay 186 to terminal $T_{57}$, from terminal $T_{57}$ to terminal $T_8$, from terminal $T_8$ through full throttle limit switch 138 to terminal $T_7$, and from terminal $T_7$ through the other side of line switch 194 to fuse 192.

Double pole single throw switch 200 is the means whereby operating control of an engine under test may be set for either manual or automatic. The open position of the switch corresponds to manual control, and its closed position corresponds to automatic control. Terminals $T_{17}$ and $T_{18}$ are indicated to show the power connections to the coil element of relay 150 of the Wheatstone bridge circuit. When switch 200 is open, there will be no current flowing in this coil element. Likewise, there will be no power input to the coil element of relay 156 of the dynamometer control circuit of FIG. 7 across terminals $T_{19}$ and $T_{20}$ (shown in FIGS. 6 and 7). When switch 200 is closed, however, assuming switch 194 to be closed also, the coil elements of relays 150 and 156 will both be energized to shift the relay contacts to positions alternate to those shown in FIGS. 6 and 7, that is, to positions corresponding to automatic operation.

Before tracing out or explaining the function of other electrical circuits, certain individual circuit elements appearing in FIG. 11 will be identified. Elements 202, 204, 206, 208, 210, 212, and 214 are microswitches. All seven of these switches are of the "normally open" kind; that is, their internal terminals will not be connected electrically in the absence of an external actuating force. Elements 216, 218, 220, 222, 224, and 226 are each two-terminal "latch type" relays comprising two coil units, and are used for making or breaking connections in a single line. The internal terminals or contacts of these relays have neither a normally open nor a normally closed condition, but rather will remain in whichever condition, open or closed, corresponds to their coil element which was last energized or to however they may have been set manually. Each of the coil elements of these six relays is marked either "O" or "C." The "O" designation means that the coil element so marked acts to open the contacts of the relay of which it is a part, and the "C" designation indicates a coil element which acts to close its related contacts. Element 228 is also a latch type relay having two coil elements, and lacking any particular normal condition of its contacts. It differs from relays 216, etc., in that it has three internal terminals or contacts rather than two, and is used for making or breaking connections in two lines. It may be closed on either terminals $T_{60}$ and $T_{61}$ or terminals $T_{60}$ and $T_{62}$, but cannot make both closures simultaneously.

Element 230 is an electric motor which is fitted with suitable speed reducing gearing to give a relatively low turning rate of its output shaft, about ½ r.p.m. for example. This motor is reversible, and is used to drive certain cams as will be more fully explained further on in this specification. Element 232 is a double pole, single throw switch in line with motor 230 through relay 228.

Elements 234, 236, and 238 are timer relays. Relay 234 is designated the idling timer; relay 236 the motoring timer, and relay 238 the road load timer. These relays each perform not only the customary function of opening and closing electrical contacts, but also a delay function. They may be set by external levers for delay periods extending to some maximum value. For exemplary values, the maximum delay period for idling timer 234 may be 60 seconds; that for motoring timer 236 may be 60 seconds also, and that for road load timer 238 may be 15 minutes. For scheduling purposes longer period timers may be inserted. A device suitable for use as timer 234, 236, or 238 would be Variable Time Delay Timer, Type TDAF, manufactured by Industrial Timer Corp., Newark, N.J., each individual device being constructed with a delay period range appropriate for the particular application intended. The internal operation of one of these timer relays will be described at least in terms of its external effects, and it is to be understood that this description is applicable to the operation of the other two timer relays as well.

Consider the idling timer 234. This is connected at terminals $T_{63}$ and $T_{64}$ across two electrical leads wherethrough input power for its own operation is supplied. In respect of points whereto external circuits to be controlled may be connected, timer 234 is provided with three terminals $T_{65}$, $T_{66}$, and $T_{67}$. Suppose that there is zero input power voltage available across terminals $T_{63}$ and $T_{64}$. Suppose further that the external lever whereby the delay period of the timer is set indicates a time delay of zero. In this circumstance an electrical connection will exist between terminals $T_{65}$ and $T_{66}$, but there will be no connection between terminals $T_{66}$ and $T_{67}$, just the opposite of the situation shown in FIG. 11. Now suppose that the external setting lever of the timer is turned to indicate some finite time delay, 10 seconds for example. At the start of turning of this lever and as a result of mechanical rather than electrical action, the electrical connection between terminals $T_{65}$ and $T_{66}$ will be broken and a connection will be made between terminals $T_{66}$ and $T_{67}$; that is, a situation will be created as shown in FIG. 11.

With terminals $T_{65}$, $T_{66}$, and $T_{67}$ of timer relay 234 electrically connected or disconnected as shown in FIG. 11, and with the external setting lever of the relay adjusted for a 10-second delay, suppose that an actuating voltage is applied and maintained across terminals $T_{63}$ and $T_{64}$. Upon application of this voltage the running of the delay period will commence, and this may be indicated by motion of a pointer lever other than the external setting lever. At the end of 10 seconds the relay will operate to break the electrical connection across terminals $T_{66}$ and $T_{67}$ and make a connection across terminals $T_{65}$ and $T_{66}$. The external setting lever will, however, remain adjusted for a 10-second delay assuming that its adjustment is not changed by hand or any other external means. The condition of a connection made across terminals $T_{65}$ and $T_{66}$ but no connection existing across terminals $T_{66}$ and $T_{67}$ will continue for as long as the relay actuating voltage is maintained across terminals $T_{63}$ and $T_{64}$. Once this voltage is discontinued, however, idling timer 234 will act to break the connection across terminals $T_{65}$ and $T_{66}$ and make a connection across terminals $T_{66}$ and $T_{67}$, that is, restore or reset the electrical conditions shown in FIG. 11.

Suppose that after this resetting the actuating voltage is applied again across terminals $T_{63}$ and $T_{64}$, and the running of the delay period is started once more. Suppose now, however, that application of this voltage is not continued for 10 seconds but only for some shorter period, 5 seconds for example. There will be no making or breaking of electrical connections across terminals $T_{65}$, $T_{66}$, and $T_{67}$, and when the voltage is discontinued at the end of 5 seconds there will be such an internal resetting of the timer that if an actuating voltage be applied for the third time it will have to be continued for the full 10-second delay period before an electrical connection is made across terminals $T_{65}$ and $T_{66}$ and the existing connection across terminals $T_{66}$ and $T_{67}$ is broken. Application of an actuating voltage to idling timer 234 will be indicated by the glowing of pilot light 240. Pilot lights 242 and 244 similarly indicate energization of motoring timer 236 and road load timer 238 respectively.

The individual circuit elements of FIG. 11 have now all been identified and their functions indicated to some extent. Sequence of operation of the several switches and relays there illustrated has not been described, but such description will be given in the course of or subsequent to the following description of the engine controller of this invention with emphasis upon its mechanical or mechano-electrical apparatus embodiment and mode of operation.

Referring next to FIG. 12, in one apparatus embodiment of this invention the engine controller 62 has been constructed in highly compact form within a single cabinet 246. All indicators and manipulable controls which are part of the controller itself have been located on a single panel of this cabinet for convenience of observation and operation. These indicators and controls will be identified according to their lettered legends in this figure and their reference numbers in earlier figures. The pilot lights marked "Power," "Motoring," "Motoring Ignition," and "Full Throttle Overtime" are respectively lights 196 (FIG. 11), 174 (FIG. 9), 178 (FIG. 9), and 188 (FIG. 10). The switches marked "On-Off Cam Motor," "On-Off Power," "Run-Start Dynamometer," "#1–#2 Battery," and "Automatic-Manual Control" are respectively switches 232 (FIG. 11), 194 (FIG. 11), 166 (FIGS. 7 and 8), 152 (FIG. 6), and 200 (FIG. 11). The dial faces and indicator levers marked "Road Load Timer," "Idling Timer," and "Motoring Timer" relate respectively to timer relays 238, 234, and 236 (all in FIG. 11). The pilot lights located directly above these dial faces in the same order are respectively lights 244, 240, and 242 (all in FIG. 11). The dial faces and indicator knobs marked "Manual Speed Control" and "Manual Throttle Control" relate respectively to potentiometer 158 (FIG. 7) and rheostat 142 (FIG. 6).

Referring next to FIG. 13, the cam mechanism of the engine controller, which fits entirely within cabinet 246, is generally designated 248. In this mechanism a mounting face plate 250 is supported on and secured to a mounting base plate 252, and is braced thereto by two mounting side plates such as 254. Also supported on and secured to base plate 252 is a carriage support base plate 256 which has secured to it a carriage support face plate 258. Two carriage support side plates such as 260 provide bracing between base plate 256 and face plate 258. A motor carriage face plate 262 is secured to carriage support face plate 258. Secured to and extending back from face plate 262 is a motor carriage base plate 264. Two motor carriage side plates such as 266 provide bracing between face plate 262 and base plate 264.

Mounted on carriage base plate 264 is cam motor 230 shown in diagrammatic form in FIG. 11. An apparatus suitable for this service is Model 300 Geared Motor supplied by Merkel-Korf Gear Co., Chicago, Ill. This machine is a 115-volt, 60-cycle A.C. reversible induction motor with integrally constructed gearing to provide an output speed of about ½ r.p.m. The output shaft of this motor extends forwardly through face plates 262 and 258 and is fixedly fitted with spur gear 268. This gear meshes with spur gear 270 which is supported in and associated with other parts of cam mechanism 248 in a manner to be described presently. In one apparatus embodiment of this invention actually constructed, gear 268 has ninety-six teeth and gear 270 has eighty teeth. The motor carriage structure may be shifted vertically on face plate 258 to permit changing of gears for the obtaining of different gear ratios.

There are two actual cam elements in cam mechanism 248. These are carburetor or throttle control cam 272 and dynamometer or speed control cam 274. They are shown in individual contour outline in FIG. 14. The cams are held in spaced relation to each other by a spacer element 276. By means of dowel pins and through bolts the two cams 272 and 274 and the spacer 276 are made into a rigid assembly; that is, they are assembled so that there can be no relative motion between the cams. The whole assembly of cams 272 and 274 and spacer 276 is fixedly fitted onto a cam shaft 278. This shaft is supported in bearings in mounting face plate 250 and carriage support face plate 258. Besides the cam and spacer assembly, spur gear 270 is also mounted on and fixedly fitted to cam shaft 278. It may be seen, therefore, that rotation of the output shaft of motor 230 will cause rotation of cams 272 and 274 through the meshed engagement of gears 268 and 270.

Mounted to and appropriately offset from face plate 250 by suitable bracket means are the translatory or linear rheostat 146 (FIG. 6) and potentiometer 162 (FIG. 7). An apparatus suitable for use as this rheostat, electrical connections being made to only two of its external terminals, is Linear Motion Potentiometer, Model 108, 1,000 ohms, 2.25-inch travel, supplied by Brierly Davis Co., Summit, N.J. An apparatus suitable for use as this potentiometer is Linear Motion Potentiometer, Single Element Type RVT, 5,000 ohms total resistance (2,000 ohms/inch), supplied by Technology Instrument Corp., Acton, Mass. Operating rods 280 and 282 extend downwardly from the slider elements 148 and 164 of the rheostat and potentiometer respectively. Each operating rod has a yoke configuration at its lower end, and within these configurations are mounted roller cam followers 284 and 286 on shafts 288 and 290 as shown.

Followers 284 and 286 ride the prepared surfaces of throttle control cam 272 and dynamometer control cam 274 respectively. Continuous contact of the followers and the cams is caused by tension springs 292 and 294. Spring 292 extends downwardly from an upper engagement on follower shaft 288 to a lower engagement on screw 296 threaded rearwardly through mounting face plate 250. Spring 294 extends downwardly from an upper engagement on follower shaft 290 to a lower engagement on spring bracket 298 affixed to carriage support face plate 258.

The seven microswitches 202, 204, 206, 208, 210, 212, and 214 shown diagrammatically in FIG. 11 are all mounted on the rear side of face plate 250. One of them, 204, is particularly identified in FIG. 13. Location of this one and the six others will be shown in FIG. 14. All seven of these microswitches of cam mechanism 248 are tripped in the course of cam motion by either one of two pins 300 and 302 extending forwardly from throttle control cam 272. These tripping pins will conveniently take the form of screws threaded through the throttle control cam. Desirably there will be access holes in dynamometer control cam 274 aligned with the heads of screw pins 300 and 302 to allow insertion, adjustment, and removal of these pins from the back of the cam mechanism.

Referring next to FIG. 14, the full contours of throttle and dynamometer control cams 272 and 274 are shown therein, that of the former appearing in broken outline where it is hidden by that of the latter according to the direction of the view. The operating surfaces of cams 272 and 274 appearing in this figure, whereon ride roller followers 284 and 286 of the operating rods of linear rheostat 146 and potentiometer 162, are approximately those to which the throttle and dynamometer control cams used in one apparatus embodiment of this invention have been cut for carrying out a particular engine test cycle to be described subsequently in this specification.

In the bracket means whereby linear rheostat 146 is supported from mounting face plate 250 there are shown two ball bearing assemblies 304 and 306 having their outer surfaces in running contact with the rheostat operating rod 280. Similarly located bearings 308 and 310 are associated with operating rod 282 of linear potentiometer 162. These bearings serve to prevent sidewise deflection of the rods as they move in and out of the rheostat and potentiometer in their working strokes, even though transverse loading be applied at their lower ends.

As stated earlier, microswitches 202, 204, 206, 208, 210, 212, and 214 are all affixed to the rear side of face plate 250. These seven switches are shown in broken outline in FIG. 14 as they would be located beyond both cams 272 and 274 according to the direction of the view. The heads of the screw pins 300 and 302 which trip these switches are indicated also. It may be seen that switches 202, 204, 208, 210, 212, and 214 are all positioned to be tripped by pin 300, while only switch 206 may be tripped by pin 302.

Angular regions X and Y on throttle control cam 272 and dynamometer control cam 274 respectively are specially identified. These are idling regions wherein and whereon roller followers 284 and 286 should be resting at the beginning of a particular operating cycle to be described subsequently in this specification.

Referring finally to FIG. 15, the details of attachment of rheostat 146, potentiometer 162, and microswitches 202, 204, 206, 208, 210, 212, and 214 to mounting face plate 250 are illustrated therein. In each case the attachment is effected by wing nuts tightened against face plate 250 on screws extending from the individual piece of equipment, or its bracket support in the cases of the rheostat and potentiometer, through slots in the face plate. These slots, straight in the cases of those for the rheostat and potentiometer brackets and arcuate in the cases of those for the microswitches, are important in that they allow flexibility of positioning of the rheostat and potentiometer to obtain the proper range of stroke of their operating rods 280 and 282, and flexibility of positioning of the microswitches to regulate the timing of events in the operating cycle of engine controller 62.

A typical procedure for starting and operating an internal combustion engine connected into a dynamometer arrangement including the engine controller of this invention according to FIG. 1 will now be described.

Initially, the operator should go to the operating panel of engine controller 62 and set the several timers, 234, 236, and 238, for their desired cycle values. The knob of manual throttle control rheostat 142 is set at closed throttle position. The knob of manual speed control potentiometer 158 is set at low speed. Control switch 200 is put in "manual." Dynamometer switch 166 is put in "start." Power switch 194 is put in "on," and must be in this position for approximately one minute before any attempt is made to use engine controller 62. Battery switch 152 is thrown for selection of either battery $B_1$ or $B_2$ as desired. Cam motor switch 232 is put in "off." It is assumed that cams 272 and 274 are left resting in an idling position with followers 284 and 286 in regions X and Y.

Next at the console of the engine test cell, the operator should check to see that manual switch 56 is thrown to be closed on its terminals $T_{36}$ and $T_{37}$. This will leave engine 30 and dynamometer 34 under control of the console; that is, engine controller 62 will be operatively isolated from the engine and dynamometer system. Other controls at the console not specifically identified in this application and not constituting part of the present invention may be set for starting the engine in the usual manner.

With controls at engine controller 62 and the test cell console set as aforesaid, the engine-dynamometer combination is started from the console, and brought up to a speed of approximately 500 r.p.m. This will involve use of start-stop controller 54 and potentiometer 58. At the stated speed of approximately 500 r.p.m., engine 30 will be firing, but will also be receiving a motoring power input from dynamometer 34. After the engine has been held at approximately 500 r.p.m. for a time sufficient to show that it is in good running order, manual switch 56 is thrown to close on its terminals $T_{38}$ and $T_{39}$, and transfer control of absorb-motor selector 50 to relay 172.

As this happens with no current in the coil element of relay 172, the coil element of relay 170 will be deenergized and that of relay 168 will be energized, and thus in dynamometer 34 power will be switched from motoring coil 110 to absorbing coils 100. When this change is effected, dynamometer switch 166 is thrown from "start" to "run"; that is, it is thrown from closure on terminals $T_{28}$ and $T_{29}$ to closure on terminals $T_{23}$ and $T_{24}$.

With manual switch 56 closed on terminals $T_{38}$ and $T_{39}$, and dynamometer switch 166 put in "run," control of engine 30 has been passed to manually operated throttle control rheostat 142 and speed control potentiometer 158. By manipulation of these controls, engine performance is further regulated as necessary to achieve an essentially idling condition. Once this condition has been achieved, engine controller 62 has full control over engine 30 and dynamometer 34 on a manual basis. Transfer may be made next from manual to automatic control through the engine controller. This is done simply by throwing control switch 200 from "manual" to "automatic," that is, simply by closing this switch. As aforenoted, it is presumed that cams 272 and 274 have been left resting in their idling position. With the engine running at about 500 r.p.m., transition from manual to automatic operation will thus be very smooth.

After completion of this transition with switch 200 put in "automatic," cam motor switch 232 may be thrown from "off" to "on"; that is, this switch may be closed to energize cam motor 230 and start rotational motion of throttle control cam 272 and dynamometer control cam 274. From here on, the timers and cams will proceed to regulate the length and nature of the cycles through which the engine is operated. No further manipulation of engine controller 62 will be necessary. To check that engine 30 is running satisfactorily, various performance indicators such as thermometers, pressure gauges, and speed and torque measuring instruments should be read periodically to see that operating conditions are being maintained safe and in accordance with the desired program.

It is to be understood that suitable means of a kind well known in the engine testing art will be incorporated into the system, although not specifically into engine controller 62, for shutting down engine 30 automatically should the engine speed rise above a predetermined absolute upper safe limit. A special feature of the safety system of engine controller 62 is that it will prohibit motoring of an engine on test unless its throttle has come to an essentially closed position; that is, unless shaft 132 of motor 130 has been turned far enough in closing throttle plate 32 to cause arm 136 to bear upon the button of and close switch 140.

Reference should now be made again to FIG. 11 for further and more detailed consideration of the working of the general relay system in connection with other elements and systems of the engine controller of this invention.

When power switch 194 is closed, pilot light 196 will be lit and power will be available for operation of current amplifier 198. Control switch 200 may be either open for manual operation of the engine controller or closed for automatic operation. In the case of manual operation, control of the engine on test is exercised through speed control potentiometer 158 and throttle control rheostat 142, the knobs of which potentiometer and rheostat are accessible at the front panel of cabinet 246 of engine controller 62. It is believed that manual operating procedure is of a generally obvious nature, and will not be considered further here. The remainder of this description will relate to automatic operation; that is, operation in which control switch 200 is closed with linear potentiometer 162 replacing rotary potentiometer 158, and linear rheostat 146 replacing rotary rheostat 142 as electrically effective elements in the operating circuits.

An exemplary program of automatic operations for which a throttle control cam 272 and a dynamometer or speed control cam 274 have been cut, and which has been carried out using a 1956 model automotive V-8 265-cubic inch displacement engine is as follows:

Cycle (A) 45 seconds idle at 400 to 425 r.p.m.
(B) One full-throttle acceleration.
(C) Repeat the following sequence for ten minutes:

| Speed (r.p.m.) | 2,100 | 2,100 | 2,100 | 2,100 | 2,100 | 2,100 | 2,100 | 2,100 |
|---|---|---|---|---|---|---|---|---|
| Horsepower | 26.5 | 16 | 26.5 | 49 | 26.5 | 16 | 26.5 | 49 |
| Time Interval (Seconds) | 7.5 | 7.5 | 7.5 | 7.5 | 7.5 | 7.5 | 7.5 | 7.5 |

Conditions (A) Intake air, 135° F.
(B) Water outlet, 180° F.
(C) Oil sump, 225° F. maximum.
(D) Every 48 hours engine is shut down for 6 hours.
(E) New piston rings and valve train assembly used in each test.
(F) In engine assembly, manufacturer's tolerances to be adhered to.

Commencing automatic operation according to the foregoing program with the assembly of throttle control cam 272 and dynamometer or speed control cam 274 oriented in idling position, screw pin 300 may be either slightly to the left or slightly to the right of the roller follower of microswitch 212 as these apparatus elements are shown in FIG. 14. This is because of the angular width of the designated idling X and Y regions on cams 272 and 274. Cam motor switch 232 is assumed to be closed. Idling timer 234 is assumed to be running if screw pin 300 is to the left of the roller follower of microswitch 212. The several latch type relays are assumed to be properly set. Particular settings of these relays will be described in greater detail further on in this specification.

If screw pin 300 be initially to the left of the roller follower of microswitch 212, there will be no rotational motion of the cam assembly during the running of the delay period set on timer 234. If screw pin 300 be initially to the right of this microswitch follower, there will be clockwise rotation of the cams until the screw pin has overridden the follower of microswitch 212 to close this switch, and start the running of the period of the idling timer. Microswitch 212 acts as an idling shut-off for cam motor 230 upon being closed, and so this motor will be deenergized when screw pin 300 depresses the microswitch follower. The screw pin may be carried beyond the follower by the inertia of moving parts, but even though this will allow microswitch 212 to snap open again there will be no reenergization of the cam motor during the remainder of the idling period.

The cams will stop with screw pin 300 slightly to the left of the follower of microswitch 212, and with roller followers 284 and 286 of rheostat 146 and potentiometer 162 still resting in and on the X and Y regions of cams 272 and 274 respectively. During the course of the cam motion just described, if it takes place at all, roller followers 284 and 286 will be running on cam surfaces of uniform radius. Thus this motion will cause no changes in the settings of the rheostat and potentiometer.

During the idling period, slider 148 of rheostat 146 and slider 164 of potentiometer 162 will be so adjusted that engine 30 will be maintained in an idling condition; that is, throttle plate 32 will be oriented in essentially closed position and no speed control will be exercised. This is a state of no load although dynamometer 34 will be connected as a power absorbing device at this time. At the end of the idling period with the attendant shifting of external circuit contacts of idling timer 234, cam motor 230 will be energized and the actuating voltage theretofore applied to timer 234 will be interrupted to allow the idling timer to reset itself. The cams will be turned clockwise in the view of FIG. 14 until screw pin 300 bears upon the roller follower of and closes microswitch 214. When this switch is closed, it will cause an actuating voltage to be applied to road load timer 238 to start the running of the preset period of this timer. Even though microswitch 214 snaps open again as pin 300 passes beyond its follower, there will be no interruption of actuating voltage to the road load timer until later in the operating cycle.

According to the stated program of operations, and using cams 272 and 274 having profiles substantially as shown in FIG. 14, full throttle acceleration will take place at the end of the idling period. This is effected by opening throttle 32 of engine 30 and regulating the dynamometer or speed control system according to the cut of the cams as these cams cause displacement of the slider elements of rheostat 146 and potentiometer 162.

As motor 230 continues to drive the cam assembly in a clockwise direction screw pin 300 will bear upon; depress; pass beyond, and release the roller follower of microswitch 202. This microswitch is intended to function generally as a reversing switch for cam motor 230. At this particular point in the operating cycle, however, it will be ineffective for its general purpose, and its temporary closing will achieve no electrical or mechanical result. The cams will thus continue to be turned until screw pin 300 is carried around to bear upon the roller follower of and close microswitch 204 which, like microswitch 202, has the general function of a reversing switch for cam motor 230.

Upon the closing of microswitch 204 just described, a reversal in direction of rotation of cam motor 230 will be effected, and screw pin 300 will be carried back toward microswitch 202. Now when microswitch 202 is closed by the screw pin there will be an electrical and mechanical effect, namely a second reversal in direction of rotation of cam motor 230. Screw pin 300 will once again be carried around to bear upon and depress the roller follower of microswitch 204. When microswitch 204 is closed the second time, there will be a third reversal in direction of rotation of cam motor 230, and screw pin 300 will be carried back again toward microswitch 202, etc.

Successive reversals in direction of rotation of motor 230 imposing oscillatory motion on cams 272 and 274 to carry pin 300 back and forth between microswitches 202 and 204 will continue during the time period set on road load timer 238. The change in load is effected by change in contour of throttle control cam 272, for in the region of its periphery which is passed back and forth under cam follower 286 during the oscillatory motion just described speed control cam 274 is characterized by a uniform radius. Of course, for a different program of operations, speed variation could be provided during the road load period if desired. When the road load period expires, timer 238 will operate to interrupt the circuit in which microswitch 204 is located so that on the last closing of this switch there will be no electrical effect, and, consequently, no reversal in direction of rotation of cam motor 230.

With continued clockwise rotation of the cams by motor 230, screw pin 300 will be carried on past the roller follower of microswitch 204. The next thing to happen will be that of screw pin 302 bearing upon, depressing, passing beyond, and releasing the roller follower of microswitch 206 to close this switch temporarily. When microswitch 206 is closed it will cause interruption of the actuating voltage being applied to road load timer 238, and so permit this timer to reset itself. Even though microswitch 206 opens again as screw pin 202 passes beyond its follower, there will be no new application of voltage to the road load timer until later in the operating cycle.

Following the reopening of microswitch 206, clockwise motion of the assembly of cams 272 and 274 will be continued. Screw pin 300 will bear upon; depress; pass beyond, and release the roller follower of microswitch 208 to close this switch temporarily. Closing of microswitch 208 and contemporaneous action of cam 272 cause switching of dynamometer 34 from a power absorbing to a motoring device and closing of throttle plate 32. The condition of motoring is not changed even though microswitch 208 opens again as screw pin 300 passes beyond its follower.

There will be no stopping or reversal of cam motor 230 by any action of microswitch 208. The cams will, accordingly, continue to be turned clockwise to cause screw pin 300 to bear upon the roller follower of and close microswitch 210 which, like microswitch 212, acts as a shut-off for cam motor 230 upon being closed. However, whereas microswitch 212 acts as a cam motor shut-off for idling of engine 30, microswitch 210 shuts the cam motor off for motoring of the engine. In addition to causing cam motor 230 to stop, closing of microswitch 210 will also cause an actuating voltage to be applied to motoring timer 236 to start the running of the preset period of this timer. Screw pin 300 may be carried beyond the roller follower of microswitch 210 by the inertia of moving parts, but even though this will allow the microswitch to snap open again there will be no re-energization of the cam motor nor interruption of actuating voltage to the motoring timer until later in the operating cycle.

Motoring operation of engine 30 and dynamometer 34 will be continued throughout the running of the period set on timer 236. When this period expires and the external contacts of the motoring relay are shifted, cam motor 230 will be energized again to provide further clockwise rotation of the assembly of cams 272 and 274. Additionally, application of an actuating voltage on timer 230 will be energized again to provide further clockwise reset itself. Still further, dynamometer 34 will be switched back to a power absorbing device. The cams will continue to be turned to cause screw pin 300 to bear upon the roller follower of and close microswitch 212 to stop the cam motor for idling of engine 30, an actuating voltage being applied to idling timer 234 upon the closing of microswitch 212.

With the starting of timer 234, one complete cycle of operation of engine controller 62 to carry out the stated operating program of engine 30 will have been concluded and a second cycle begun. This cycle and successive cycles as many in number as desired may be carried out without any further adjustment of or attention to controller 62 except, possibly, occasional manipulation of switch 152 to alternate usage of battery $B_1$ and battery $B_2$ in the throttle positioning apparatus Wheatstone bridge circuit.

Particular settings of latch type relays 216, 218, 220, 222, 224, 226, and 228 will now be considered. For purposes of carrying out the operating procedure just described, the seven designated relays must have a definite order of being closed or open at any given point or time in the cycle. Once these relays are in order they will not come out of it; that is, they will be properly synchronized for all controller operations thereafter. Taking as an example the condition of the latch relays when the engine controller is operating in the road load period of the cycle; that is, when the assembly of cams 272 and 274 is oscillating to carry screw pin 300 back and forth between microswitches 202 and 204, specific settings will be as follows:

Relay 216 latched closed,
Relay 218 latched closed,
Relay 220 latched closed,
Relay 222 latched open,
Relay 224 latched open,
Relay 226 latched open,
Relay 228 latched closed on terminals $T_{60}$ and $T_{61}$ when the cams are being turned clockwise, and
Relay 228 latched closed on terminals $T_{60}$ and $T_{62}$ when the cams are being turned counterclockwise.

The oscillatory motion of the cams in the road load period of the operating cycle is a significant feature of this invention. Such motion conserves cam space, and allows road load conditions to be maintained for any period which may be set on timer 238.

Although this invention has been described with a certain degree of particularity, it is to be understood that the present disclosure has been made only by way of example, and that numerous changes in the details of construction and the combination and arrangement of parts may be resorted to without departing from the spirit and scope of this invention as hereinafter claimed. Especially is it to be understood that while this description has been primarily that of a method and means for imposing control on internal combustion engines in accordance with a previously determined and recorded program, in its broadest sense the present invention is not limited to the control of such engines only. Rather, as indicated at the beginning of this specification, this invention is considered suitable for exercising programmed control over operating equipment and processes generally.

In the course of this specification, considerable attention has been paid to cams having surfaces cut or modulated in contour according to a predetermined program. Essentially these cams constitute signal storage members, particularly as they cooperate with follower members in contacting relation to their contour-modulated surfaces through relative motion between themselves and these followers. The followers will transmit displacement signals from the surfaces with which they are in contact. Relative motion between a signal storage member and a follower may be translational as well as or instead of rotational, and it may result from motion of the follower member across an absolutely stationary signal storage member as well as from motion of the signal storage member or absolute motion of both the signal storage and follower members.

It is not to be thought that the apparatus or method of this invention is limited structurally or operationally to utilization of only signal storage devices of the nature of plate-type cams 272 and 274 having contour-modulated outer peripheral surfaces. It is within the contemplation of the present invention to employ grooved plate cams, cylindrical cams, or indeed any signal storage members each having at least one surface modulated in contour with respect to a reference point or points, which may be on the member itself, to store signals in the member for subsequent transmission therefrom as displacements of at least one follower member in contacting relation and relative motion to the contour-modulated surface. Within the spirit and scope of this invention, however, it is not intended that signal storage members having contour modulated surfaces shall include perforated tapes.

In setting forth the operation of the apparatus embodiment of this invention herein described according to a particular program, it has been pointed out that oscillatory motion of cams 272 and 274 in the road load period of the operating cycle conserves cam space, and allows road load conditions to be maintained for any period which may be set on timer 238. This oscillatory motion constitutes a periodic reversal of direction of relative motion between the contour-modulated surfaces of cams 272 and 274 and the cam followers of throttle control rheostat 146 and dynamometer or speed control potentiometer 162.

Not only will such reversal of direction of relative motion conserve cam space as stated, but also it will generate sequences of displacement signals at the cam followers in addition to those which will be generated thereat by the over-riding unidirectional motion between the cams and their followers, this latter motion resulting from clockwise rotation of cams 272 and 274 as seen in the view of FIG. 14. By generation of these additional sequences of signals, which of course exercise at least temporary control upon the operation of engine 30 and dynamometer 34, the range of possibilities of automatic operational testing procedures for the engine and dynamometer, and indeed for dynamically functioning equipment generally, is enlarged considerably.

What is claimed is:

1. A system for imposing automatic operating control according to a predetermined program upon a fuel-burning engine, said system comprising (1) a fuel-burning engine and an eddy current dynamometer coupled thereto, said engine being characterized by a throttle mechanism and said dynamometer being characterized by at least two magnetizing current coils, one associated only with the function of supplying motoring power input to said engine and another associated only with the function of absorbing combustion power output from said engine, (2) a positioning apparatus connected in power transmitting relation to said throttle mechanism, (3) a selector apparatus electrically connected to said dynamometer coils whereby magnetizing current may be directed alternately to the coil for motoring and the coil for power absorbing, (4) a magnetizing current circuit electrically connected to said selector apparatus whereby the magnitude of current flowing in whichever of said coils is energized at any given time according to the operation of said selector apparatus may be regulated, (5) a control signal generating apparatus which includes at least one signal storage member characterized by at least two surfaces modulated in contour according to signals stored in said member, at least one follower member in contacting relation to one of said surfaces, at least another follower member in contacting relation to the other of said surfaces, said signal storage member and said follower members being relatively moveable with respect to each other to generate displacement signals at said follower members in accordance with the contour modulations of said signal storage member surfaces, and actuating means operatively connected to said signal storage member and said follower members to cause relative and at least partially oscillatory motion therebetween, (6) signal transmitting means connecting one of said follower members and said positioning apparatus, and (7) signal transmitting means connecting the other of said follower members and said magnetizing current circuit.

2. A system according to claim 1 which further includes safety means operatively connected to said throttle mechanism and said selector apparatus, said safety means being of a nature to prevent said selector apparatus from directing magnetizing current to the dynamometer coil for motoring unless said throttle mechanism is in an essentially closed position.

3. A system according to claim 1 which further includes switching means electrically connected to said selector means whereby said selector means may be operated to direct magnetizing current to either said coil for motoring or said coil for power absorbing, said switching means being so disposed with respect to said signal storage member and said follower members to be actuated according to relative motion between said signal storage and follower members.

References Cited in the file of this patent

UNITED STATES PATENTS

| | | |
|---|---|---|
| 1,508,353 | Scott | Sept. 9, 1924 |
| 2,414,356 | Bogen et al. | Jan. 14, 1947 |
| 2,685,199 | Wilson et al. | Aug. 3, 1954 |